United States Patent
Funatsu

(10) Patent No.: US 10,873,696 B2
(45) Date of Patent: Dec. 22, 2020

(54) IMAGE CAPTURE APPARATUS AND CONTROL METHOD FOR THE SAME

(71) Applicant: CANON KABUSHIKI KAISHA, Tokyo (JP)

(72) Inventor: Yoshihiro Funatsu, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 169 days.

(21) Appl. No.: 15/878,842

(22) Filed: Jan. 24, 2018

(65) Prior Publication Data

US 2018/0220062 A1 Aug. 2, 2018

(30) Foreign Application Priority Data

Jan. 30, 2017 (JP) ................................ 2017-014515

(51) Int. Cl.
*H04N 5/232* (2006.01)
*G06F 3/0485* (2013.01)
(Continued)

(52) U.S. Cl.
CPC ....... *H04N 5/23216* (2013.01); *G06F 3/0485* (2013.01); *G06F 3/0488* (2013.01);
(Continued)

(58) Field of Classification Search
CPC ....... G06F 3/0412; G06F 3/0416–0418; G06F 3/0488–04886; G02F 1/13338;
(Continued)

(56) References Cited

U.S. PATENT DOCUMENTS

2009/0262211 A1* 10/2009 Mori ...................... G06F 3/0412
348/222.1
2011/0019058 A1* 1/2011 Sakai ................... G06F 3/04847
348/333.01

(Continued)

FOREIGN PATENT DOCUMENTS

CN   101212574 A   7/2008
CN   102215344 A   10/2011
(Continued)

OTHER PUBLICATIONS

Notification of the First Office Action issued by the State Intellectual Property Office of the People's Republic of China dated Dec. 4, 2019 in corresponding CN Patent Application No. 201810087655.5, with English translation.

(Continued)

*Primary Examiner* — Xi Wang
(74) *Attorney, Agent, or Firm* — Carter, DeLuca & Farrell LLP

(57) ABSTRACT

An image capture apparatus controls the image capture apparatus, in a case where a subject image can be viewed via a viewfinder, so that a moving distance of a predetermined item, which indicates a designated area on a display unit within the viewfinder that can be viewed via the viewfinder, moves for a first moving distance of a touch position on a touch panel is larger when the designated area has a second size larger than a first size, than when the designated area has the first size. It is possible to increase operability for a user in the case of moving an item, whose size is variable, by moving the touch position.

30 Claims, 10 Drawing Sheets

(51) Int. Cl.
  *G06F 3/0484* (2013.01)
  *G06F 3/0488* (2013.01)
(52) U.S. Cl.
  CPC ..... *G06F 3/04847* (2013.01); *H04N 5/23212* (2013.01); *H04N 5/23293* (2013.01)
(58) Field of Classification Search
  CPC .. H04N 1/00411; H04N 5/23216; G02B 7/09; G02B 7/102; G02B 7/28–40; G03B 13/36
  USPC ............... 348/345–357, 333.01; 359/698; 396/77–78
  See application file for complete search history.

(56) References Cited

U.S. PATENT DOCUMENTS

2013/0329114 A1* 12/2013 Kim ............... H04N 5/23212
                                                      348/333.12
2015/0077381 A1*  3/2015 Park ................. G06F 3/013
                                                      345/174
2015/0199066 A1*  7/2015 Kim .................. G06F 3/0416
                                                      345/173
2016/0027201 A1*  1/2016 Saito ................. G06F 3/0485
                                                      345/475
2016/0269615 A1*  9/2016 Deng ..................... G06T 7/80

FOREIGN PATENT DOCUMENTS

| JP | H11355617 A   | 12/1999 |
| JP | 2012089973 A  | 5/2012  |
| JP | 2012-118192 A | 6/2012  |
| JP | 2012-203143 A | 10/2012 |
| JP | 2013080996 A  | 5/2013  |

OTHER PUBLICATIONS

Notice of Reasons for Refusal issued by the Japan Patent Office dated Jul. 13, 2020 in corresponding JP Patent Application No. 2017-014515, with English translation.

* cited by examiner

F I G. 1A
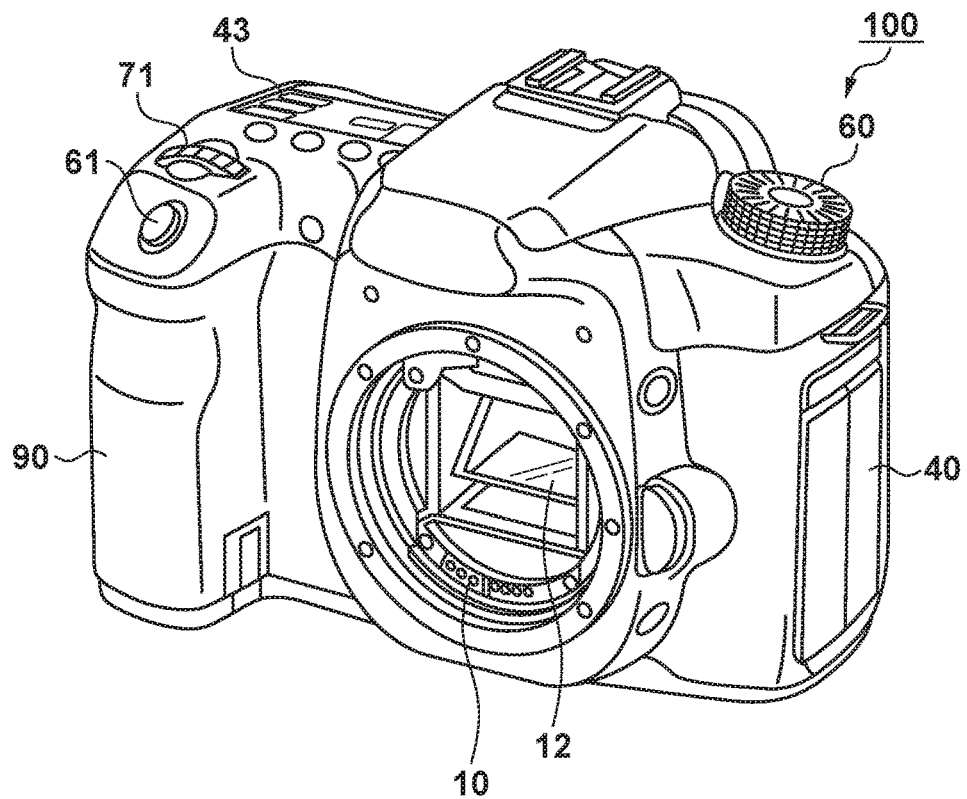
F I G. 1B
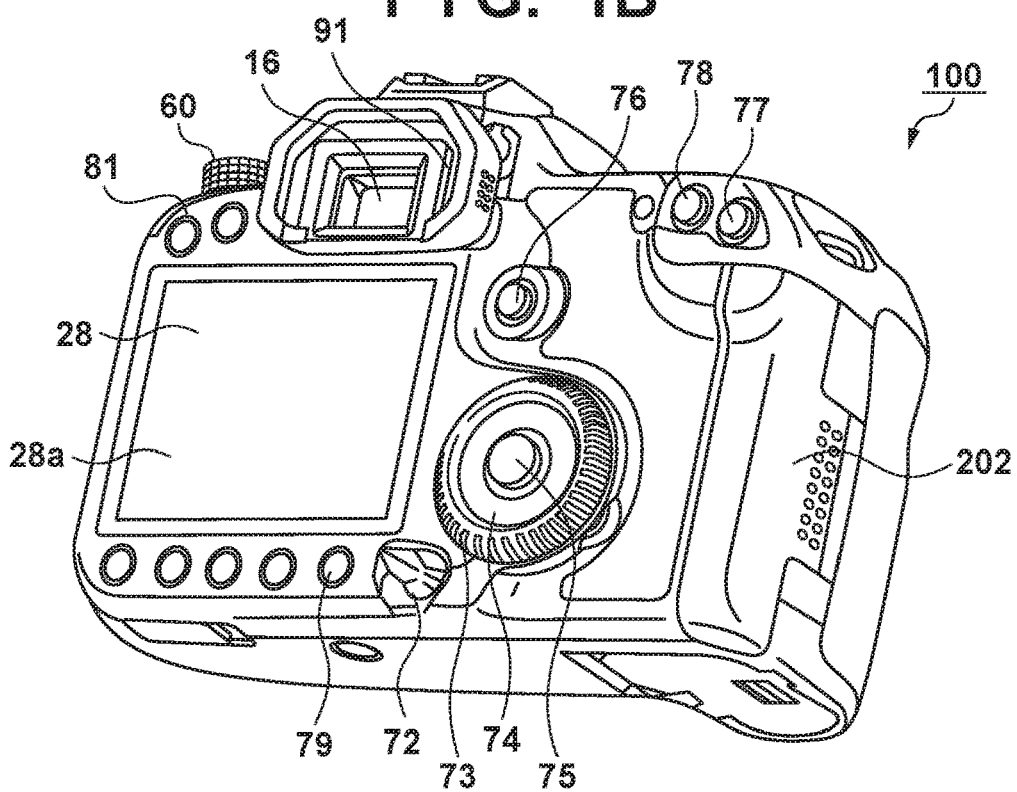

FIG. 4A
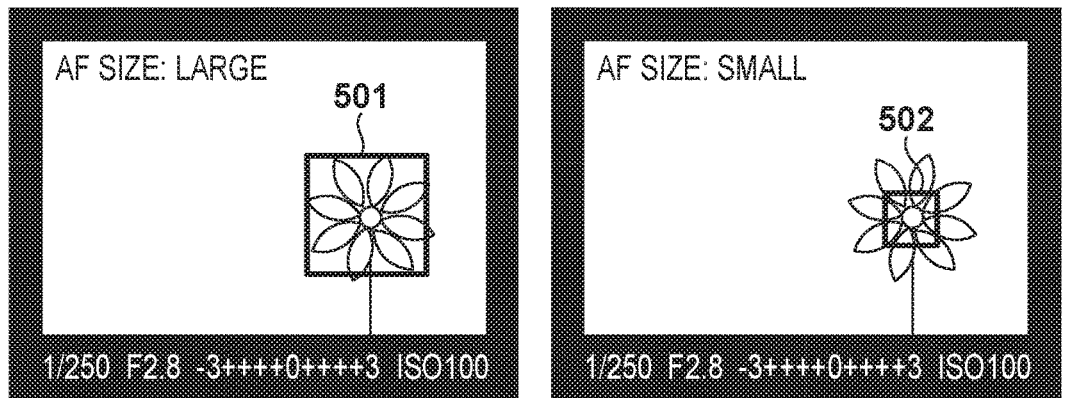
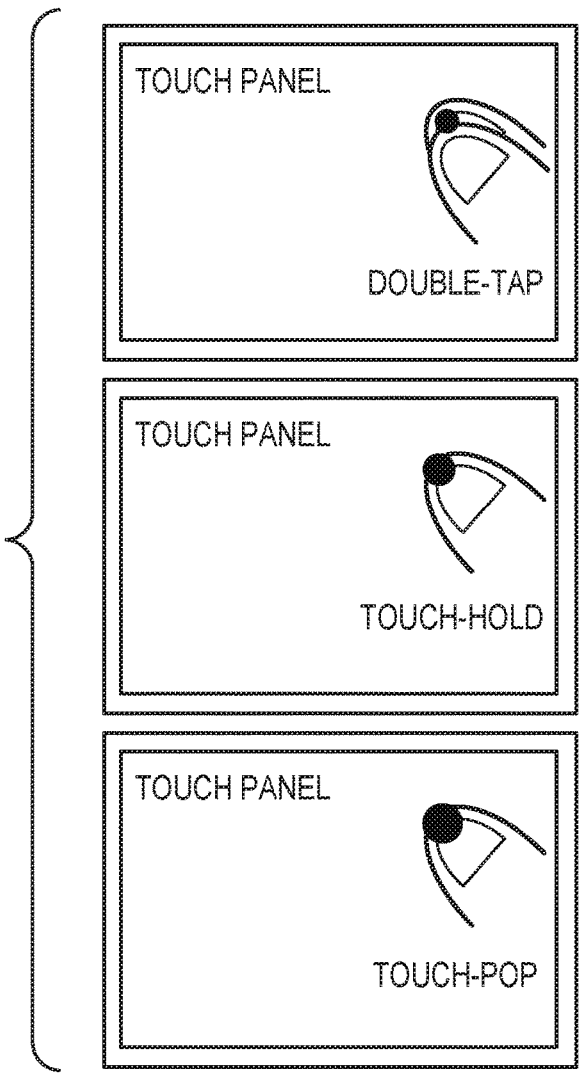
FIG. 4B

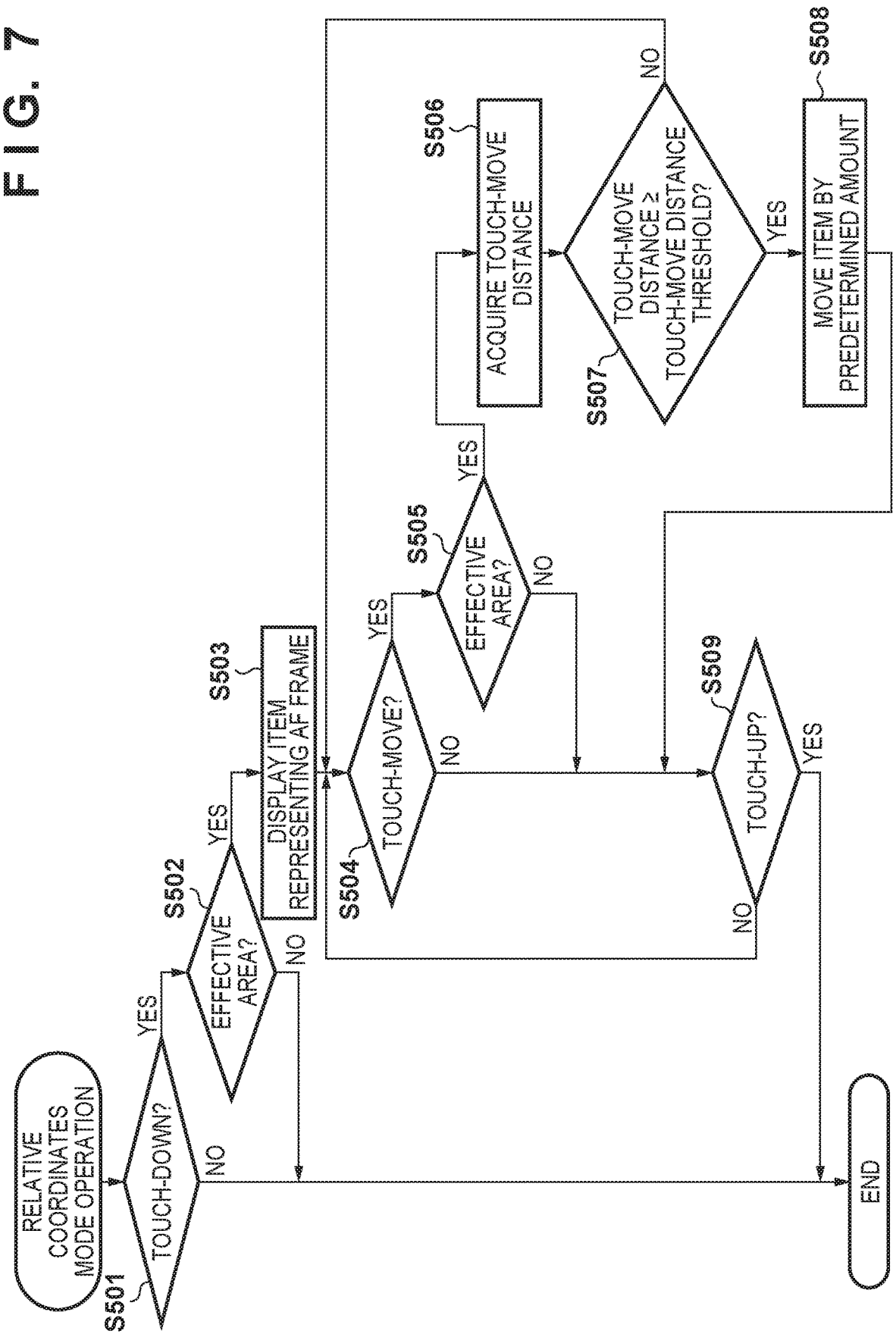

IMAGE CAPTURE APPARATUS AND CONTROL METHOD FOR THE SAME

BACKGROUND OF THE INVENTION

Field of the Invention

The present invention relates to an image capture apparatus and a control method for the same, and more particularly to a technique for moving an item through an operation made to a touch panel.

Description of the Related Art

Touch input devices, which are able to detect a contact position at which a stylus or a finger touches or movement thereof on a touch-sensitive surface, facilitate intuitive input operations and are therefore widely used. Recently, many image capture apparatuses such as digital cameras also include a touch input device such as a touch display.

Japanese Patent Laid-Open No. 2012-203143 discloses an image capture apparatus that includes a viewfinder of a look-though type and enables movement and selection of an AF target as well as instruction to execute an AF operation, through an operation made to a touch display.

Japanese Patent Laid-Open No. 2012-118192 discloses that AF frames of different sizes are selected in accordance with the strength of a touch, with a touch position serving as the center, in an image capture apparatus that uses both a viewfinder of the look-though type and a touch panel.

In the case of the method of performing a touch operation while viewing the viewfinder described in Japanese Patent Laid-Open No. 2012-203143, when, for example, an AF frame is greatly moved from one end to the other end of a display screen, a user needs to perform a touch-move from one end to the other end of the display screen or to repeat a touch-move many times. Then, if a setting is configured so that an AF frame greatly moves with a small touch-move distance (the amount by which the touch position is moved by a touch-move), the display position may greatly change with a small amount of operation. However, in the case where the AF frame size is variable as in Japanese Patent Laid-Open No. 2012-118192, when the AF frame is small, it may be difficult for a user, who wants to adjust the AF position relative to a small subject, to finely adjust the AF position.

SUMMARY OF THE INVENTION

The invention has been made in view of the foregoing problem in the conventional technique. The present invention increases operability for a user in the case of moving an item, whose size is variable, by moving a touch position.

According to an aspect of the present invention, there is provided an image capture apparatus comprising: a touch detection unit configured to detect a touch operation made to a touch panel; and a control unit configured to control the image capture apparatus, in a case where a subject image can be viewed via a viewfinder, so as to move a predetermined item when a touch position on the touch panel moves, wherein the predetermined item indicates a designated area on a first display unit that is within the viewfinder and can be viewed via the viewfinder, wherein the control unit controls, in a case where the designated area has a second size larger than a first size, a moving distance of the predetermined item for a first moving distance of the touch position is to be larger than in case where the designated area has the first size.

According to another aspect of the present invention, there is provided an image capture apparatus comprising: a touch detection unit configured to detect a touch operation made to a touch panel; and a control unit configured to control the image capture apparatus, in a case of a relative coordinates mode in which a predetermined item, which indicates a designated area, is not displayed at a position on a display unit corresponding to a position at which a touch with the touch panel was started, and the predetermined item is displayed at a position to which the predetermined item has moved in accordance with an amount of a movement of the touch from a position of the predetermined item on the display unit before the movement of the touch is detected, so that a moving distance of the predetermined item on the display unit for a first moving distance of the touch position on the touch panel is larger when the designated area has a second size larger than a first size than when the designated area has the first size.

According to a further aspect of the present invention, there is provided an image capture apparatus comprising: a touch detection unit configured to detect a touch operation made to a touch panel; and a control unit configured to perform control so that, in a case where, of the touch panel, an area in which a touch operation for moving a predetermined item indicating a designated area can be accepted has a size smaller than a predetermined size, a moving distance of the predetermined item for the first moving distance of the touch position on the touch panel is larger when the designated area has a second size larger than a first size than when the designated area has the first size.

According to another aspect of the present invention, there is provided an image capture apparatus comprising: a touch detection unit configured to detect a touch operation made to a touch panel; and a control unit configured to control the image capture apparatus so as to move a predetermined item when a touch position on the touch panel moves, wherein the predetermined item indicates a designated area on a first display unit that is within the viewfinder and can be viewed via the viewfinder, wherein the control unit controls, in a case where the designated area has a second size larger than a first size, a moving distance of the predetermined item for a first moving distance of the touch position is to be larger than in case where the designated area has the first size.

According to a further aspect of the present invention, there is provided a method for controlling an image capture apparatus comprising: detecting a touch operation made to a touch panel, by a touch detection unit; and controlling the image capture apparatus, in a case where a subject image can be viewed via a viewfinder, so as to move a predetermined item when a touch position on the touch panel moves, wherein the predetermined item indicates a designated area on a first display unit that is within the viewfinder and can be viewed via the viewfinder, wherein in the controlling, in a case where the designated area has a second size larger than a first size, a moving distance of the predetermined item for a first moving distance of the touch position is controlled to be larger than in case where the designated area has the first size.

According to another aspect of the present invention, there is provided a method for controlling an image capture apparatus comprising: detecting a touch operation made to a touch panel, by a touch detection unit; and controlling the image capture apparatus, in a case of a relative coordinates mode in which a predetermined item, which indicates a designated area, is not displayed at a position on a display unit corresponding to a position at which a touch with the touch panel was started, and the predetermined item is displayed at a position to which the predetermined item has moved in accordance with an amount of a movement of the touch from a position of the predetermined item on the display unit before the movement of the touch is detected, so that a moving distance of the predetermined item for a first moving distance of the touch position on the touch panel is larger when the designated area has a second size larger than a first size than when the designated area has the first size.

According to a further aspect of the present invention, there is provided a method for controlling an image capture apparatus comprising: detecting a touch operation made to a touch panel, by a touch detection unit; and controlling the image capture apparatus, in a case where, of the touch panel, an area in which a touch operation for moving a predetermined item can be accepted has a size smaller than a predetermined size, so that a moving distance of the predetermined item for a first moving distance of the touch position is to be larger when a designated area has a second size larger than a first size than when the designated area has the first size.

According to another aspect of the present invention, there is provided a method for controlling an image capture apparatus comprising: detecting a touch operation made to a touch panel; and controlling the image capture apparatus so that a moving distance of a predetermined item for designating a subject on a display unit within the viewfinder that can be viewed via the viewfinder for a first moving distance of a touch position on the touch panel is larger when a designated area has a second size larger than a first size, than when the designated area has the first size.

According to a further aspect of the present invention, there is provided a non-transitory computer-readable storage medium storing a program that is executable by one or more processors, the program, when executed by the one or more processors, causes the one or more processors to perform a method for controlling an image capture apparatus comprising: detecting a touch operation made to a touch panel, by a touch detection unit; and controlling the image capture apparatus, in a case where a subject image can be viewed via a viewfinder, so as to move a predetermined item when a touch position on the touch panel moves, wherein the predetermined item indicates a designated area on a first display unit that is within the viewfinder and can be viewed via the viewfinder, wherein in the controlling, in a case where the designated area has a second size larger than a first size, a moving distance of the predetermined item for a first moving distance of the touch position is controlled to be larger than in case where the designated area has the first size.

According to another aspect of the present invention, there is provided a non-transitory computer-readable storage medium storing a program that is executable by one or more processors, the program, when executed by the one or more processors, causes the one or more processors to perform a method for controlling an image capture apparatus comprising: detecting a touch operation made to a touch panel, by a touch detection unit; and controlling the image capture apparatus, in a case of a relative coordinates mode in which a predetermined item, which indicates a designated area, is not displayed at a position on a display unit corresponding to a position at which a touch with the touch panel was started, and the predetermined item is displayed at a position to which the predetermined item has moved in accordance with an amount of a movement of the touch from a position of the predetermined item on the display unit before the movement of the touch is detected, so that a moving distance of the predetermined item for a first moving distance of the touch position on the touch panel is larger when the designated area has a second size larger than a first size than when the designated area has the first size.

According to a further aspect of the present invention, there is provided a non-transitory computer-readable storage medium storing a program that is executable by one or more processors, the program, when executed by the one or more processors, causes the one or more processors to perform a method for controlling an image capture apparatus comprising: detecting a touch operation made to a touch panel, by a touch detection unit; and controlling the image capture apparatus, in a case where, of the touch panel, an area in which a touch operation for moving a predetermined item can be accepted has a size smaller than a predetermined size, so that a moving distance of the predetermined item for a first moving distance of the touch position is to be larger when a designated area has a second size larger than a first size than when the designated area has the first size.

According to another aspect of the present invention, there is provided a non-transitory computer-readable storage medium storing a program that is executable by one or more processors, the program, when executed by the one or more processors, causes the one or more processors to perform a method for controlling an image capture apparatus comprising: detecting a touch operation made to a touch panel; and controlling the image capture apparatus so that a moving distance of a predetermined item for designating a subject on a display unit within the viewfinder that can be viewed via the viewfinder for a first moving distance of a touch position on the touch panel is larger when a designated area has a second size larger than a first size, than when the designated area has the first size.

Further features of the present invention will become apparent from the following description of exemplary embodiments with reference to the attached drawings.

BRIEF DESCRIPTION OF THE DRAWINGS

FIGS. 1A and 1B are perspective views showing an example of the appearance of a digital camera according to an embodiment of the present invention.

FIGS. 4A to 4D are schematic diagrams related to touch operations according to the embodiment.

FIG. 7 is a flowchart related to the details of step S304 in FIG. 3.

DESCRIPTION OF THE EMBODIMENTS

Figure 2:
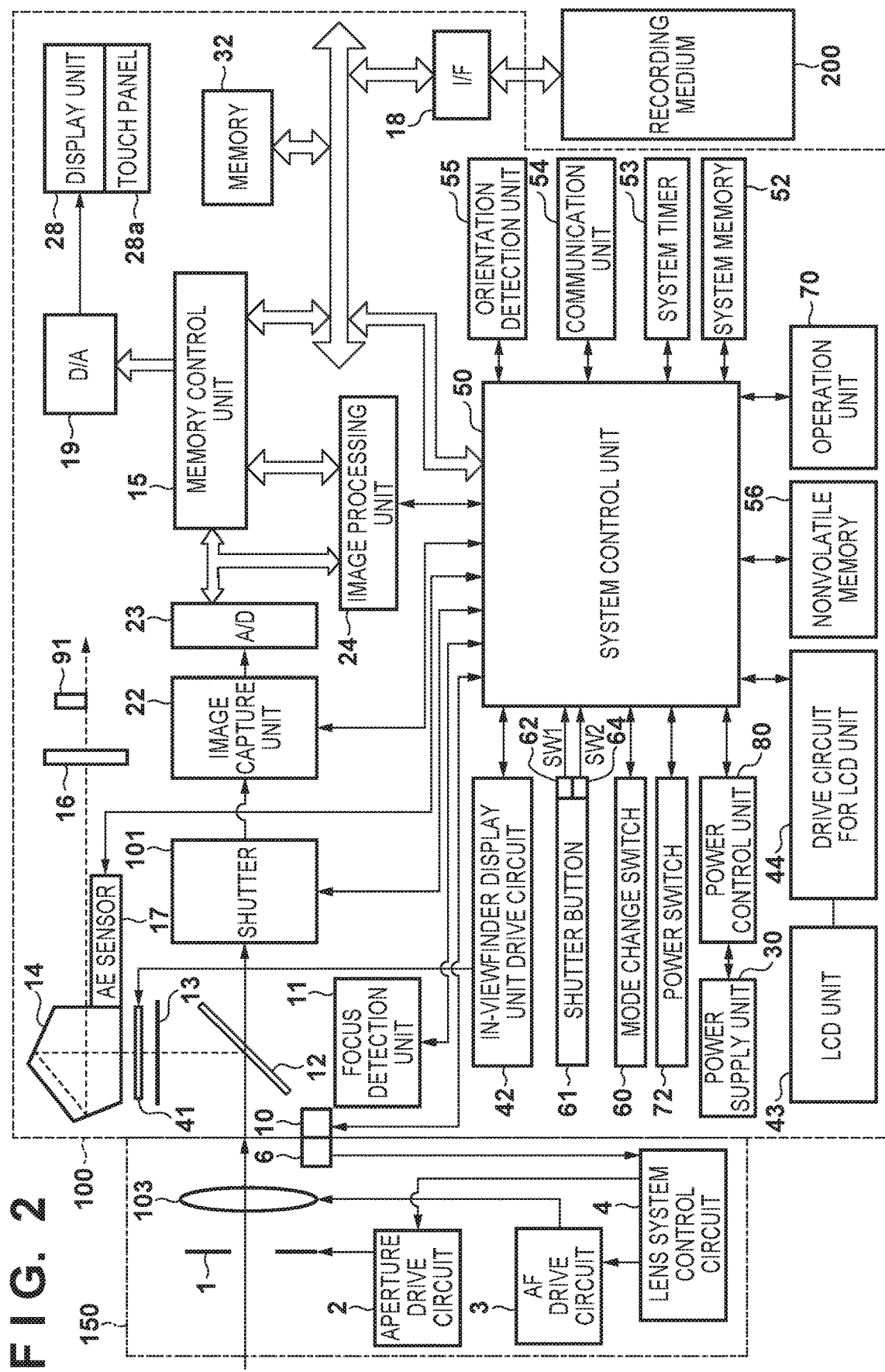
FIG. 2 is a block diagram showing an example of a functional configuration of the digital camera according to the embodiment.

Exemplary embodiments of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

An exemplary embodiment of the present invention will be described in detail with reference to the drawings. Note that, although an embodiment in which the present invention is applied to a digital camera 100 will be described below, the present invention is applicable to any image capture apparatuses that include a display apparatus and a touch input device. Note that the image capture apparatus includes not only image capture apparatuses with an integrated lens and so-called mirrorless, interchangeable-lens image capture apparatuses, but also electronic devices including an image capture function. Such electronic devices include smartphones, personal computers, tablet terminals, game machines, and the like, but are not limited thereto.

FIGS. 1A and 1B are perspective views showing an example of the appearance of a digital camera 100 according to this embodiment. FIG. 1A shows the appearance of a front face and an upper face, and FIG. 1B shows the appearance of a rear face and a bottom face.

A display unit 28 displays a viewfinder image (live view image), various kinds of information (set values etc.) regarding the digital camera 100, reproduced images, GUI display screens, and the like. The display unit 28 is a touch display in which a touch panel 28a is incorporated, and can detect touch operations (on/off, position, movement, strength etc.) made on the display unit 28. The touch panel 28a may also be a touch pad that is provided separately from the display unit 28 to enable a touch to be detected.

A shutter button 61 inputs a shooting preparation start instruction and a shooting start instruction to the digital camera 100 in accordance with the amount of pressing. A mode change switch 60 sets, for the digital camera 100, an operation mode corresponding to its position after being rotated. A terminal cover 40 is openable, and protects connectors for connection with external devices via cables. A main electronic dial 71 is rotatable and is used, for example, to change set values for the shutter speed, aperture, and the like.

A power switch 72 turns on and off a power supply to the digital camera 100. A sub-electronic dial 73 is rotatable, and is rotated to switch the item to be selected from among selectable items and to change the image to be reproduced, for example. A cross key 74 can be pressed at its upper, lower, left, and right portions, and is used to select an item corresponding to a pressed portion from among items in a menu screen, for example. A SET button 75 is mainly used to determine the item to be selected.

A multi-controller 76 enables input in a total of eight directions, namely upper, lower, left, right upper-right, lower-right, upper-left, and lower-left directions. A live view (LV) button 81 is used to switch between ON and OFF of the display of a live view image on the display unit 28. In a moving image shooting mode, the LV button 81 is used to give instructions to start and stop shooting (recording) of a moving image. A zoom-in button 77 is used to switch between ON and OFF of a zoomed-in display of the live view image and increase the magnification ratio during zoomed-in display. In a reproduction mode, the zoom-in button 77 is also used to switch between ON and OFF of a zoomed-in display of a reproduced image and increase the magnification ratio during zoomed-in display. Contrary to the zoom-in button 77, a zoom-out button 78 is used to reduce the magnification ratio of a displayed zoomed-in image. A reproduction button 79 is used to switch between the shooting mode and the reproduction mode of the digital camera 100. Upon the reproduction button 79 being pressed while the digital camera 100 is operating in the shooting mode, the digital camera 100 is switched to the reproduction mode, and displays the latest image among images recorded in a recording medium on the display unit 28.

A quick return mirror 12 (hereinafter referred to simply as a mirror 12) can be lifted up and down by an actuator, and is lifted up while shooting. A terminal 10 is used to supply power to a lens unit (interchangeable lens) attached to the digital camera 100 and to communicate with the lens unit.

A viewfinder 16 is for observing an optical image of a subject through the interchangeable lens and to determine a composition for shooting. An eyepiece sensor 91, which serves as a proximity detection unit, is provided near the viewfinder 16, and is used to detect an object in proximity to an eyepiece portion (a state where a user is viewing the viewfinder).

A lid 202 protects a slot for accommodating a removable recording medium, such as a memory card. A grip portion 90, in which a battery is accommodated, is formed into a shape that enables the digital camera 100 to be readily held.

FIG. 2 is a block diagram showing an exemplary functional configuration of the digital camera 100 shown in FIGS. 1A and 1B, with the same reference numerals assigned to the structures shown in FIGS. 1A and 1B.

In a lens unit 150, a shooting lens 103 is usually constituted by a plurality of lenses, but is depicted with only one lens. An aperture 1 is driven by an aperture drive circuit 2. A focusing lens included in the shooting lens 103 is driven by an AF drive circuit 3. A terminal 6 comes into contact with the terminal 10 when the lens unit 150 is attached to the digital camera 100, and is used to receive the supply of power from the digital camera 100 and communicate with the digital camera 100. More specifically, a lens system control circuit 4 in the lens unit 150 and a system control unit 50 in the digital camera 100 communicate with each other through the terminals 6 and 10. For example, the lens system control circuit 4 controls the aperture 1 via the aperture drive circuit 2 in accordance with an instruction from the system control unit 50, and also controls an in-focus position of the shooting lens 103 via the AF drive circuit 3.

An AE sensor 17 acquires luminance information regarding an optical subject image that is formed on a focusing screen by the lens unit 150. A focus detection unit 11 is a phase difference sensor, and outputs defocus information regarding a predetermined focus detection area to the system control unit 50. The system control unit 50 performs automatic focus detection (AF, autofocus) by determining the amount and direction of movement of the focusing lens based on the defocus information, and driving the focusing lens through the lens system control circuit 4. Note that AF can also be executed using a contrast detection method, an image-plane phase-difference detection method, or the like.

A mirror 12 can be switched between a down-state (shown in FIG. 2) and an up-state. In the down-state, a light beam from the lens unit 150 enters an optical viewfinder (direction toward a focusing screen 13) and the focus detection unit 11. In the up-state, the light beam enters an image capture unit 22. The state of the mirror 12 is controlled by the system control unit 50. The system control unit 50 controls the mirror 12 so as to be in the up-state when shooting a still image and shooting a moving image (including when shooting the live view image), and controls the mirror 12 so as to be in the down-state during the other period. The center portion of the mirror 12 is a half mirror, and the light that has been transmitted through the mirror 12 in the down-state enters the focus detection unit 11 due to a sub-mirror (not shown), which is provided on the back face of the mirror 12.

In the case where the viewfinder 16 is an optical viewfinder, the user observes an image formed as a result of an optical image of a subject formed on the focusing screen 13 being superimposed on a display on an in-viewfinder display unit 41. For this reason, the user can check the position and size of the focus detection area by checking an indicator of an AF frame (item) superimposed on the optical image of the subject. Note that the viewfinder 16 may also be an electronic viewfinder. In this case, the user observes a shot live view image (through-the-lens image). In the case where the viewfinder 16 is an electronic viewfinder, the user can check the position and size of the focus detection area as a result of the display unit within the viewfinder 16 displaying the live view image and the AF frame in a superimposing manner.

In the case of an optical viewfinder, a state where an optical image can be viewed can be switched to a state where the optical path is blocked and the optical image cannot be viewed in the viewfinder 16, by switching the mirror 12 from the down-state to the up-state. A subject can also be checked by acquiring an image from the image capture unit 22 when the mirror 12 is in the up-state and displaying the acquired image (live view image) on the display unit 28. On the other hand, in the case of an electronic viewfinder, whether to display a captured image acquired by the image capture unit 22 on the display unit within the viewfinder or to display the captured image on the display unit 28 provided outside of the viewfinder can be switched.

A shutter 101 is a focal plane shutter that opens and closes due to being controlled by the system control unit 50, and exposes the image capture unit 22 for a predetermined time. The image capture unit 22 is a CCD or CMOS image sensor, for example, and converts an optical image formed by the lens unit 150 to an electrical signal (analog image signal) using a group of two-dimensionally arranged photoelectric conversion elements. An A/D converter 23 converts the analog image signal output by the image capture unit 22 to a digital image signal (image data).

An image processing unit 24 applies predetermined image processing, such as pixel interpolation (demosaicing), white balance adjustment, various corrections, resizing, color conversion, coding, and decoding, to the image data supplied from the A/D converter 23 or a memory control unit 15. In the case of performing AF processing based on information obtained by the image capture unit 22, the image processing unit 24 calculates AF evaluation values, such as defocus information and contrast information, and outputs the calculated AF evaluation values to the system control unit 50. Furthermore, the image processing unit 24 also calculates information, such as luminance information, to be used in automatic exposure control (AE), and outputs the calculated information to the system control unit 50.

The image data output by the A/D converter 23 is processed by the image processing unit 24 as necessary, and is then written to a memory 32 through the memory control unit 15. The memory 32 is used as a buffer for image data obtained during shooting, image data read out from a recording medium 200, and the like, and is also used as a video memory for the display unit 28.

A D/A converter 19 converts image data for display that is read out from a video memory area in the memory 32 to an analog signal, and supplies this analog signal to the display unit 28. The display unit 28 drives a display device, such as an LCD, based on the analog signal supplied from the D/A converter 19, and displays an image that is based on the analog signal.

In the case of displaying the live view image on the display unit 28, a moving image is shot by the image capture unit 22 with the mirror 12 kept in the up-state, and frames are sequentially displayed on the display unit 28 through the A/D converter 23, the image processing unit 24, the memory control unit 15, the memory 32, and the D/A converter 19.

The in-viewfinder display unit 41 displays an indicator (e.g. a frame-shaped indicator) of the position and size of a current focus detection area, as well as numerical values and icons indicating shooting conditions (shutter speed, f-number, ISO etc.) and set values, and the like, via an in-viewfinder display unit drive circuit 42. Note that the focus detection area is also called an AF frame or an AF area.

A liquid-crystal display (LCD) unit 43 is provided outside of the viewfinder. The LCD unit 43 displays numeric values, icons, and the like indicating shooting conditions and set values, via a drive circuit 44 for the LCD unit 43.

A system control unit 50 has one or more programmable processors, for example, and controls operations of the digital camera 100 by loading programs stored in a nonvolatile memory 56 to a system memory 52 and executing them with the programmable processors, for example. The system control unit 50 also controls operations of the attached lens unit 150. In addition, the system control unit 50 also controls display operations of the digital camera 100 by controlling the memory 32, the D/A converter 19, the display unit 28, and the like.

The nonvolatile memory 56 is an EEPROM, for example, and stores programs to be executed by the system control unit 50, various constants, set values, GUI data, and the like. A system timer 53 is a time-measuring unit for measuring time that is to be used in various kinds of control, and acquiring the time of a built-in clock.

A shutter button 61 has a first shutter switch 62, which turns on when being half-pressed, and a second shutter switch 64, which turns on when being full-pressed. The system control unit 50 interprets the ON state of the first shutter switch 62 as a shooting preparation start instruction, and interprets the ON state of the second shutter switch 64 as a shooting start instruction. Shooting preparation processing includes AF (autofocus) processing, AE (automatic exposure) processing, AWB (automatic white balancing) processing, EF (flash pre-lighting) processing, and the like. Shooting processing refers to a series of processes covering from exposure of the image capture unit 22 and readout of signals, to writing of image data to the recording medium 200.

An operation unit 70 is an input device group that is provided on the digital camera 100 and can be operated by a user, and includes switches, buttons, and dials described using FIGS. 1A and 1B. The mode change switch 60, the shutter button 61, and the touch panel 28a, which are described independently for convenience, also constitute part of the operation unit 70.

A power control unit 80 is constituted by a battery detection circuit, a DC-DC converter, a switching circuit for switching a block to be energized, and so on, and detects whether or not a battery is attached, the type of the battery, the amount of residual battery, and the like. The power control unit 80 also controls the DC-DC converter based on the detection result and an instruction from the system control unit 50, and supplies a necessary voltage to each unit.

A power supply unit 30 may be a battery, an AC adapter, or the like. A recording medium I/F 18 is an interface for the recording medium 200, which is a memory card, a hard disk, or the like.

A communication unit 54 is a communication interface for an external device, and supports communication conforming to one or more wired and/or wireless communication standards. The communication unit 54 includes a connector, an antenna, and the like corresponding to the communication standard(s).

An orientation detection unit 55, which is, for example, an acceleration sensor or a gyroscope sensor, detects an orientation and motion of the digital camera 100 and notifies the system control unit 50 of the detected orientation and motion. Based on the orientation and motion detected by the orientation detection unit 55, the system control unit 50 can determine the orientation of a shot image and realize a hand shake correction function.

As mentioned above, in this embodiment, the touch panel 28a that is incorporated in the display unit 28 is provided as an example of a touch input device. Note that the touch input device may also be provided in an area other than the display unit 28 in a housing of the digital camera 100.

The system control unit 50 can detect the following touch operations made to the touch panel 28a, or the following states thereof:

a new touch with the touch panel 28a, i.e. a start of a touch (hereinafter, "touch-down");

a state where a touch with the touch panel 28a continues (hereinafter, "touch-on");

movement of the touch position on the touch panel 28a (hereinafter, "touch-move");

disappearance of a touch with the touch panel 28a, i.e. an end of a touch (hereinafter, "touch-up"); and a state where the touch panel 28a is not touched (hereinafter, "touch-off").

Although it is assumed here that there is one touch position for convenience, a plurality of touch operations or states may also be able to be detected at a time. In addition, the strength of a touch may also be detected. Depending on the system of the touch panel 28a, proximity of a finger or a stylus to the surface of the touch panel 28a, rather than a physical contact therewith, may also be detected as a touch.

Upon a touch-down being detected, a touch-on is detected simultaneously. After a touch-down is detected, usually a touch-on continues to be detected unless a touch-up is detected. A touch-on is also detected while a touch-move is detected. Meanwhile, even if a touch-on is detected, a touch-move is not detected if the touch position does not move. A touch-off is detected if no touch-on is detected. For example, if touch-ups are detected for all touch-ons that have been detected, then a touch-off is detected.

The system control unit 50 is periodically notified of the touch position (coordinates) on the touch panel 28a, from the touch panel 28a through an internal bus. The system control unit 50 detects the aforementioned touch operations and states of the touch panel 28a based on the information regarding the touch position of which the system control unit 50 has been notified. Note that, if a touch-move is detected, the system control unit 50 can detect the direction in which the touch position moves and the speed thereof, for each of the vertical component and horizontal component of the coordinates, for example, based on a temporal change in the touch position.

The system control unit 50 can also detect a touch operation that is constituted by a specific combination of the aforementioned basic touch operations and touch panel states. For example, if a touch-move is detected and the distance by which the touch position has moved is greater than or equal to a predetermined distance, the system control unit 50 determines that a sliding (or dragging) operation has been performed. Also, if a touch-up is detected after a touch-move with a distance smaller than a predetermined distance and a time shorter than a predetermined time is performed, the system control unit 50 determines that a flicking operation has been performed. Furthermore, if no touch-move is detected after a touch-down is detected, and a touch-up is detected within a predetermined time or less, the system control unit 50 determines that a tapping operation has been performed.

In the case where the touch panel 28a can independently detect a plurality of touches, if touch-moves are detected at a plurality of (e.g. two) touch positions and these touch positions are brought close to each other, the system control unit 50 determines that a pinching-in operation has been performed. Similarly, if touch-moves are detected at a plurality of (e.g. two) touch positions and these touch positions are moved away from each other, the system control unit 50 determines that a pinching-out operation has been performed. The pinching-in operation and the pinching-out operation are collectively referred to as pinching operations.

Next, operations performed during shooting standby of the digital camera 100 having the above-described configuration will be described, particularly focusing on operations responding to touch operations, mainly using the flowchart shown in FIG. 3. An operation in each step in the flowchart is realized as a result of a programmable processor provided in the system control unit 50 loading a program stored in the nonvolatile memory 56 to the system memory 52 and executing it.

Although it is assumed in the following description that an item whose position and size can be changed by a touch operation is a focus detection area (AF frame), the present invention is also applicable similarly to a photometric area (AE frame), a zoomed-in display area, and the like. Note that these areas are conceptual areas that are used in internal processing of the digital camera 100, and cannot be actually viewed. For this reason, the position and size of these areas are usually indicated using indicators that are displayed in a superimposing manner on the live view image displayed on the display unit 28 or within the viewfinder 16. Accordingly, for users, a change in the position and size of the areas such as the AF frame has the same meaning as that of a change in the display position and size of the indicators indicating the areas. In the following description, to facilitate understanding, an indicator representing an area is described as an item whose position and size are to be changed by a touch operation, and the position and size of the indicator on an image are converted to coordinates within an image read out from the image capture unit 22 when the indicator is handled within the digital camera 100.

Figure 3:
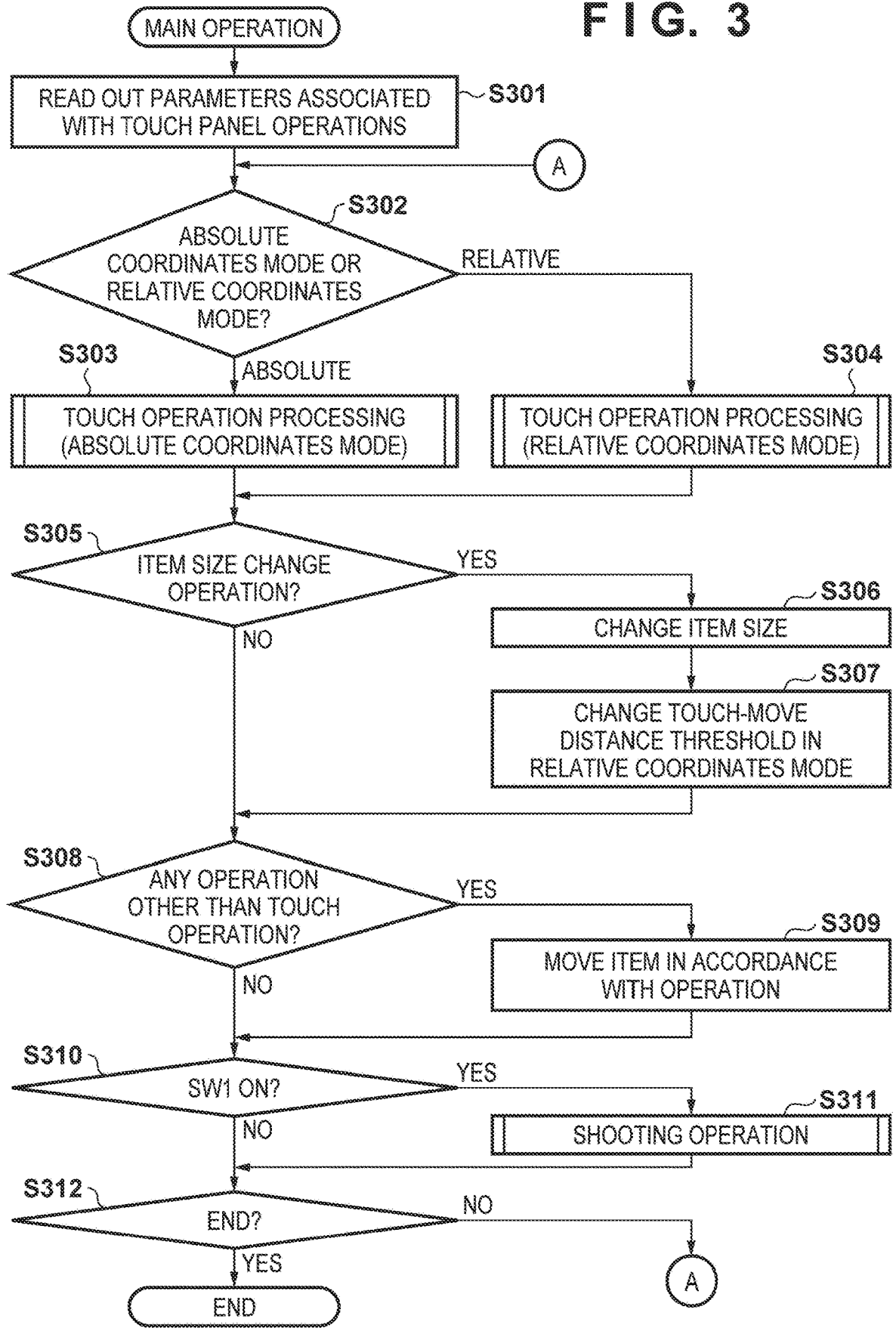
FIG. 3 is a flowchart related to main processing of the digital camera according to the embodiment.

The processing shown in FIG. 3 is processing (main processing) started after the power of the digital camera 100 has been turned on by the power switch 72 and the digital camera 100 has entered the shooting standby state, for example. In the shooting standby state, the system control unit 50 continuously executes moving image shooting with the mirror 12 lifted up, and monitors the devices constituting the operation unit 70, including the touch panel 28a, while performing an operation of generating the live view image and sequentially displaying the live view image on the display unit 28.

In step S301, the system control unit 50 reads out parameters associated with touch operations from the nonvolatile memory 56 to the system memory 52. The parameters read out here include, for example, the position and size of an effective area (an area in which a detected touch operation is deemed to be valid (or accepted)), a position designation mode (absolute coordinates mode or relative coordinates mode), information regarding correspondence between touch operations and user instructions, and the like. Note that the absolute coordinates mode is a mode of handling the coordinates within the effective area of the touch panel 28a and the coordinates within the display area of the display unit within the viewfinder 16 or the display unit 28 in association with each other. That is to say, in the absolute coordinates mode, the corresponding coordinates in the display unit within the viewfinder 16 or the display unit 28 are designated in accordance with a start of a touch (touch-down), regardless of the position of originally designated coordinates. In the case of the display unit 28, the coordinates of the touch position are designated. The relative coordinates mode is a mode of handling the coordinates in the effective area of the touch panel 28a and the coordinates in the display area of the display unit within the viewfinder 16 while deeming that these coordinates are not directly associated with each other. That is to say, in the relative coordinates mode, the corresponding coordinates in the display unit within the viewfinder 16 (or touch position in the display unit 28) are not designated in accordance with a start of a touch, and the designated coordinates are moved from the originally-set coordinates by the amount by which the touch position has moved. Note that the system control unit 50 performs touch operation determination only for a touch operation detected within the effective area, unless otherwise stated. The user may also be able to set the absolute coordinates mode or the relative coordinates mode on the menu screen.

In step S302, the system control unit 50 determines whether the position designation mode for the touch panel 28a is the absolute coordinates mode or the relative coordinates mode, advances the processing to step S303 if the determination result is the absolute coordinates mode, and advances the processing to step S304 if the determination result is the relative coordinates mode.

In step S303, the system control unit 50 performs touch operation processing in the absolute coordinates mode. The details will be described later using FIG. 5.

In step S304, the system control unit 50 performs touch operation processing in the relative coordinates mode. The details will be described later using FIG. 7.

In step S305, the system control unit 50 determines whether or not a touch operation associated with a change in the item size (size-changing operation) has been detected, advances the processing to step S306 if it is determined that the touch operation has been detected, and advances the processing to step S308 if not. There is no particular limitation on the size-changing operation. Here, the size-changing operation may also be a double-tapping operation (two successive tapping operations performed at an interval of a predetermined time or less), a touch-holding operation (a touching operation kept for a predetermined time or more; a touch-on is continuously detected for a predetermined time or more, e.g. 1.5 seconds or 2 seconds or more, after a touch-down), as shown in FIG. 4B. Furthermore, the size-changing operation may also be a touch-popping operation (an operation of strongly pressing the touch panel with a predetermined pressure or stronger). Otherwise, a configuration may also be employed in which the AF frame size can be set on the menu screen. Note that the system control unit 50 displays a frame-shaped indicator indicating the position and size of a currently-set AF frame so as to be superimposed on a subject image, as schematically shown in FIG. 4A, when a touch-down is detected in step S305.

Note that, if it is determined that the user is viewing the viewfinder 16 (i.e. if it is determined that the output of the eyepiece sensor 91 is ON), the system control unit 50 displays the indicator on the in-viewfinder display unit 41 to superimpose the indicator on the subject image. In the case where the viewfinder 16 is an electronic viewfinder, or if it is not determined that the user is viewing the finder 16 (i.e. if it is determined that the output of the eyepiece sensor 91 is OFF), the system control unit 50 displays the indicator so as to be superimposed the live view image on the display unit 28. Thus, the way of displaying the indicator differs depending on whether or not the user is viewing the viewfinder 16, but no particular distinction will be made below.

A photograph in which an intended subject is in focus can be readily taken by changing the AF frame size in accordance with the size of the subject that is to be brought into focus. For example, if a small subject is to be brought into focus, the background, rather than the intended subject, is likely to come into focus if the AF frame is large, and it is accordingly useful if the AF frame can be made small.

In step S306, the system control unit 50 changes the size of the indicator. Note that it is assumed that the size is changed so as to gradually increase (decrease) the size every time a size-changing operation is detected, and is restored to the smallest (largest) size upon reaching the largest (smallest) size. However, this may not be the case. Note that it is assumed that the indicator size is changed with the center coordinates and the aspect ratio of the indicator kept.

In step S307, the system control unit 50 changes a threshold (touch-move distance threshold), which is used to determine a touch-move distance (the amount by which the touch position has moved due to a touch-move) in the relative coordinates mode, in accordance with the changed AF frame size. Specifically, the system control unit 50 makes the threshold in the case where the AF frame size is a second size, which is smaller than a first size, larger than the threshold in the case where the AF frame size is the first size. It is assumed that a relation between the AF frame size and the threshold is defined in advance and is saved in the nonvolatile memory 56. The larger the threshold, the easier fine adjustment of the position, and accordingly the threshold is increased if the AF frame size is small. Such a dynamic change in the threshold can increase operability by making the sensitivity or responsibility of the distance by which an item moves to a touch-move lower (higher) when the AF frame size is smaller (larger), than that in the case of a larger (smaller) AF frame. Note that the same threshold may also be set for a plurality of adjacent steps of the size; e.g. the same threshold may be set for the smallest size and a size that is one-step larger.

Note that, in step S307, the position designation mode for the touch panel 28a may also be changed in accordance with the changed AF frame size. Specifically, if the changed AF frame size is smaller than or equal to a predetermined lower limit size or is larger than or equal to a predetermined upper limit size, the system control unit 50 determines the position designation mode for the touch panel 28a. If the changed AF frame size is smaller than or equal to the lower limit size in the absolute coordinates mode, the system control unit 50 changes the position designation mode to the relative coordinates mode. If the changed AF frame size is larger than or equal to the upper limit size in the absolute coordinates mode, the system control unit 50 changes the position designation mode to the relative coordinates mode. The relative coordinates mode facilitates fine position adjustment, and the absolute coordinates mode facilitates a great change in the position. Accordingly, usability can be increased by changing the position designation mode to a mode appropriate for the changed size if the AF frame size has been changed.

In the case where, in the standby state, a focusing operation continues to be performed (servo operation) on the current AF frame, there is a possibility that an unintended subject is brought into focus if the AF frame size becomes too small. For this reason, a configuration may also be employed in which, if the changed AF frame size is smaller than or equal to a predetermined lower limit size, the servo operation is temporarily suspended. Note that the lower limit size of the AF frame that serves as the condition for suspending the servo operation may also be different from the aforementioned lower limit size that serves as the condition for changing the position designation mode.

In step S308, the system control unit 50 determines whether or an instruction to move the AF frame has been input through a predetermined operation member other than the touch panel 28*a*, advances the processing to step S309 if it is determined that the movement instruction has been input, and advances the processing to step S310 if not. One or more of the operation members constituting the operation unit 70 other than the touch panel 28*a* can be assigned to operation members with which the instruction to move the AF frame can be input. Here, as an example, it is assumed that the main electronic dial 71, the sub-electronic dial 73, the cross key 74, and the multi-controller 76 are assigned as the operation members with which the instruction to move the AF frame can be input (i.e. with which the AF frame can be moved). Accordingly, in step S308, the system control unit 50 determines whether any of the main electronic dial 71, the sub-electronic dial 73, the cross key 74, and the multi-controller 76 has been operated, or none of them has been operated.

In step S309, the system control unit 50 moves the position at which the AF frame is displayed, in accordance with the direction of the operation detected in step S308. That is to say, in the case of an operation made with a dial or the cross key, the amount of movement responding to a predetermined operation is the same regardless of the size of the AF frame. For example, in the case of a dial, the distance by which the AF frame moves responding to a predetermined angle is the same, and in the case of the cross key, the distance by which the AF frame moves responding to one press is the same, regardless of the size of the AF frame. Note that the system control unit 50 moves the AF frame by a predetermined amount every time the system control unit 50 detects the input of the movement instruction in step S308. However, the amount of movement may differ depending on the type of the operation member. For example, the amount of movement responding to an operation made to a first operation member (first amount of movement) may be a predetermined amount that is independent from the AF frame size, and the amount of movement responding to an operation made to a second operation member (second amount of movement) may be an amount that depends on the AF frame size. For example, the second amount of movement is made smaller when the AF frame size is a second size that is smaller than a first size, than that when the AF frame size is the first size, similarly to the aforementioned touch-move distance threshold in the relative coordinates mode. Thus, if, for example, a small AF frame is to be moved greatly, an operation can be readily performed in which the first operation member is first operated to roughly adjust the position, and thereafter the second operation member is operated to finely adjust the position. Note that an operation member may also be provided to which the input of a movement instruction to directly move the AF frame to a preset position with one operation, rather than the input of a movement instruction to gradually change the position, is assigned. Also, the input of these movement instructions may also be assigned to specific operations (other than the touch-move or the size-changing operation) made to the touch panel 28*a*.

In step S310, the system control unit 50 determines whether or not the first shutter switch 62 is ON, advances the processing to step S311 if the first shutter switch 62 is ON, and advances the processing to step S312 if not.

In step S311, the system control unit 50 starts a still image shooting preparation operation (AF and AE operations etc.), and waits for the second shutter switch 64 to turn on. Upon the second shutter switch 64 turning on, shooting processing for recording is performed, and shot image data is included in a data file in a predetermined format and is recorded in the recording medium 200. Since processing for shooting and recording a still image can be realized by processing similar to that performed in conventional digital cameras, the details thereof will be omitted. If the recording has ended, or if the first shutter switch 62 has turned off before the second shutter switch 64 turns on, the system control unit 50 advances the processing to step S312.

In step S312, the system control unit 50 determines whether or not the current state matches a predetermined ending condition, ends the processing if it is determined that the current state matches the ending condition, and returns the processing to step S302 and continues the above processing if not. For example, the ending condition may be the case where an instruction to turn off the power of the digital camera 100 has been made by the power switch 72, the case where the reproduction mode is selected by the mode change switch 60, or the like, but is not limited thereto.

Figure 5:
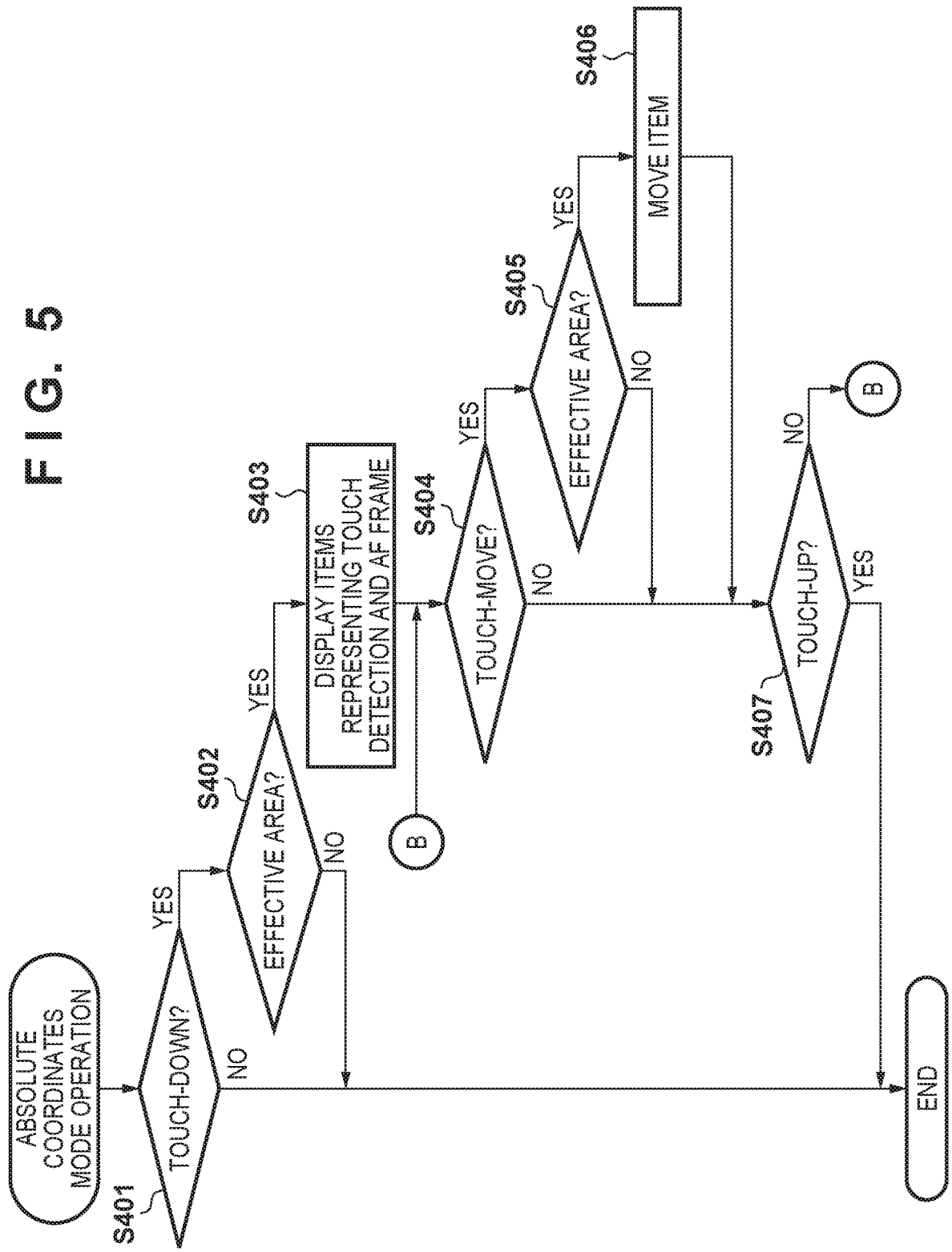
FIG. 5 is a flowchart related to the details of step S303 in FIG. 3.

Next, an absolute coordinates mode operation will be described using FIG. 5. Processing in FIG. 5 starts upon step S303 in FIG. 3 being reached. An operation in each step in the flowchart is realized as a result of a programmable processor provided in the system control unit 50 loading a program stored in the nonvolatile memory 56 to the system memory 52 and executing it.

In step S401, the system control unit 50 determines whether or not a touch-down has been detected on the touch panel 28*a*, advances the processing to step S402 if it is determined that a touch-down has been detected, and ends the processing if not.

In step S402, the system control unit 50 determines whether or not the coordinates at which the touch-down was detected in step S401 are within the effective area of the touch panel 28*a*, advances the processing to step S403 if it is determined that the coordinates are within the effective area, and ends the processing if not. Note that, in the case of the absolute coordinates mode, the effective area for touch operations may be the entire face of the touch panel 28*a*, and the determination in step S402 may not be performed.

Figure 6A:
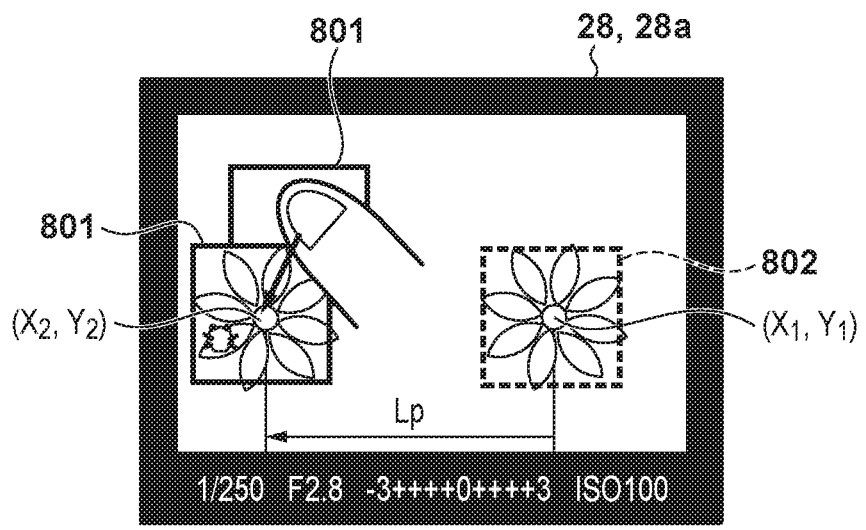
FIGS. 6A and 6B are schematic diagrams related to an absolute coordinates mode according to the embodiment.

In step S403, the system control unit 50 performs display so as to notify the user that a touch has been detected. For example, as shown in FIG. 6A, a frame-shaped touch position indicator 801 that surrounds the coordinates (touch position) at which the touch-down has been detected is displayed. Note that, in the case of displaying the indicator on the in-viewfinder display unit 41, coordinates on the touch panel 28a are converted to coordinates in the display area of the in-viewfinder display unit 41 to perform display. This will also apply to the following description and a description thereof will not be repeated.

Also, in step S403, the system control unit 50 displays an item indicator 802 indicating the position and size of the current AF frame together. Note that it is assumed here that the coordinates of the live view image (viewfinder image) corresponding to the center of the current AF frame (i.e. the center coordinates of the item indicator 802) are (X1, Y1). The touch position indicator 801 has the same size as that of the item indicator 802, and is visually differentiated from the item indicator 802.

In step S404, the system control unit 50 determines whether or not a touch-move has been detected on the touch panel 28a, advances the processing to step S405 if it is determined that a touch-move has been detected, and advances the processing to step S407 if not.

In step S405, the system control unit 50 determines whether or not the current touch position coordinates are within the effective area, advances the processing to step S406 if it is determined that the coordinates are within the effective area, and advances the processing to step S407 if not.

In step S406, the system control unit 50 moves the touch position indicator 801 to a display position with the center being the current touch position (the coordinates (X2, Y2) in FIG. 6A).

In step S407, the system control unit 50 determines whether or not a touch-up has been detected on the touch panel 28a, ends the processing if it is determined that a touch-up has been detected, and returns the processing to step S404 if not. Note that, if it is determined that a touch-up has been detected, the system control unit 50 changes the position at which the AF frame is set to the position of the moved touch position indicator 801, and erases the item indicator 802. The touch position indicator 801 then serves as the item indicator after the change. Note that a configuration may also be employed in which, when a touch-up is detected, focus detection processing is performed similarly to the case where the first shutter switch 62 turns on for the AF frame at that time. In the case of performing focus detection processing when a touch-up is detected, if the AF frame size is a predetermined size or smaller, the time taken until the focus detection processing is started is made longer than that in the case where the AF frame is larger than the predetermined size.

Figure 6B:
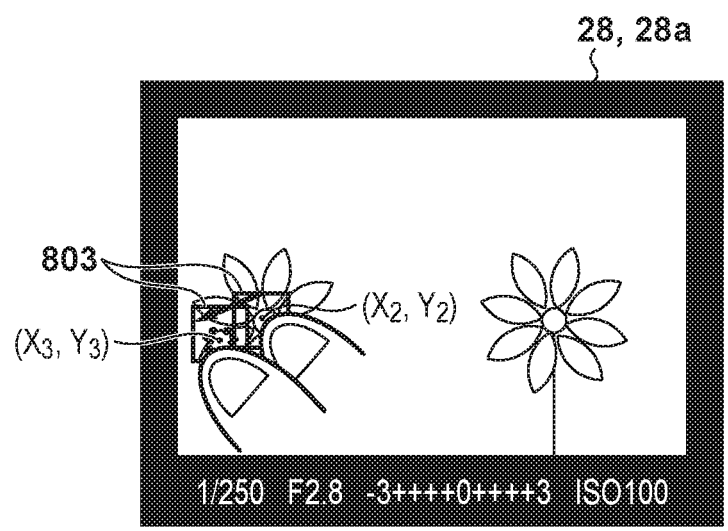

Note that, if the coordinates at which the touch-down is detected in step S401 are within the current AF frame, the system control unit 50 may display a touch position indicator corresponding to the position and size of the current AF frame, and may not display the item indicator. If a touch-move is detected in this state, the system control unit 50 moves the position of the current AF frame through the above processes in steps S404 to S406. For example, FIG. 6B shows an example of a display of a touch position indicator 803 in the case where a touch-down is detected at coordinates within the current AF frame (with the center coordinates (X2, Y2), thereafter a touch-move is detected, and a touch-up is detected at the coordinates (X3, Y3). In this case, due to the absolute coordinates mode, the distance by which the touch position has moved ((X3, Y3)-(X2, Y2)) corresponds to the distance by which the touch position indicator 803 has moved. Note that a change in the size of the AF frame between FIGS. 6A and 6B has no particular meaning.

Next, a relative coordinates mode operation will be described using FIG. 7. Processing in FIG. 7 starts upon step S304 in FIG. 3 being reached. An operation in each step in the flowchart is realized as a result of a programmable processor provided in the system control unit 50 loading a program stored in the nonvolatile memory 56 to the system memory 52 and executing it.

Processing in steps S501 to S505 is the same as processing in steps S401 to S405, and a description thereof will be omitted accordingly. However, when a touch-down is detected within the effective area, in step S503, the item indicator is displayed but the touch position indicator is not displayed, unlike in the case of the absolute coordinates mode. If a touch-move is detected within the effective area in step S505, an indicator (guide indicator) indicating the position and size of the changed (set) AF frame starts to be displayed in accordance with the distance and direction of the touch-move.

In step S506, the system control unit 50 acquires the touch-move distance as the distance from the starting coordinates to the current touch position coordinates. Note that the starting coordinates are, at first, the coordinates at which the touch-down was detected, and are then updated to the coordinates after movement every time the AF frame is moved (S508).

In step S507, the system control unit 50 determines whether or not the touch-move distance acquired in step S506 is greater than or equal to the touch-move distance threshold, advances the processing to step S508 if it is determined that the acquired touch-move distance is greater than or equal to the touch-move distance threshold, and returns the processing to step S504 if not. The touch-move distance threshold used here is a value set based on the AF frame size (i.e. a value changed in step S307 in FIG. 3).

In step S507, it is determined whether the AF frame size is large, middle, or small, and a threshold is acquired in accordance with the size; namely a threshold $\alpha 1$ ($<\alpha 2$), a threshold $\alpha 2$ ($<\alpha 3$), and a threshold $\alpha 3$ are acquired if the size is large, middle, and small, respectively. Furthermore, it is determined whether or not the touch-move distance acquired in step S506 exceeds the acquired threshold; i.e. whether or not the touch position has been moved so as to move the AF frame by a predetermined distance.

Figure 4C:
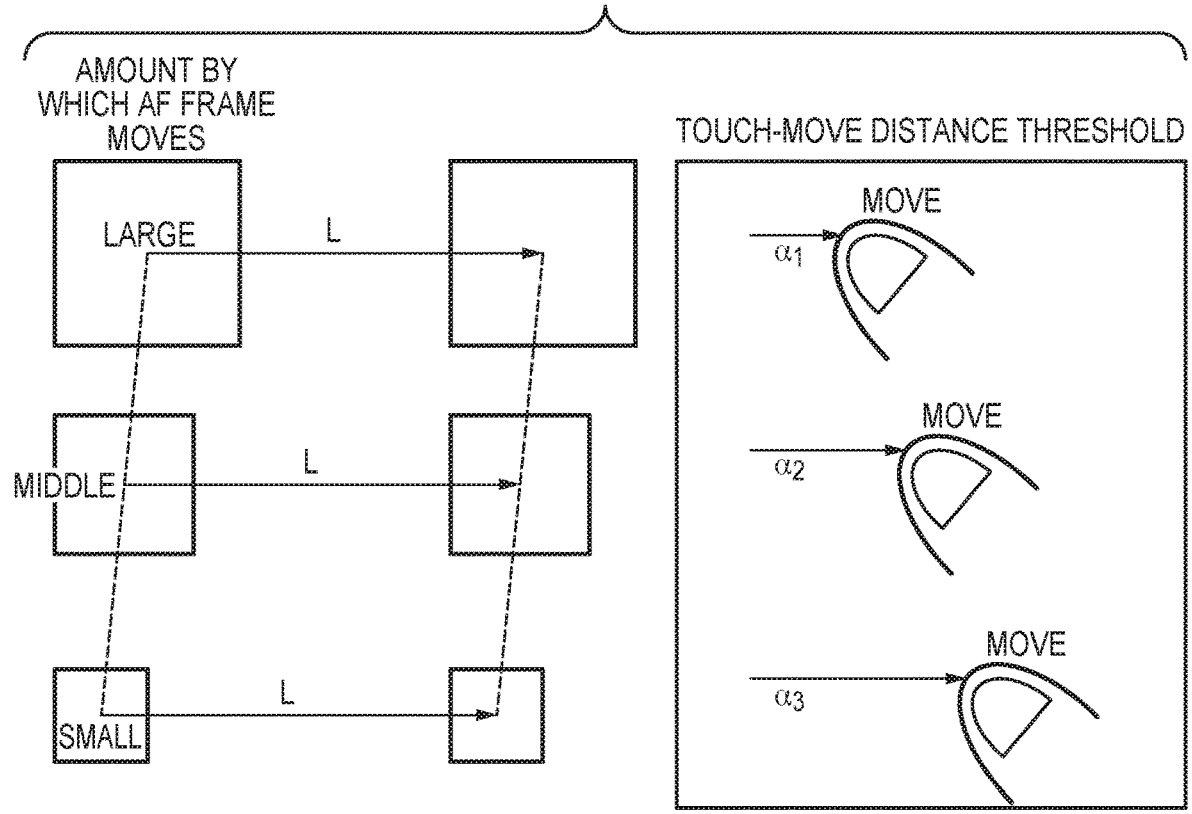

FIG. 4C schematically shows an exemplary relation between the AF frame size and the touch-move distance threshold. FIG. 4C depicts a difference in the touch-move distance that is required to move AF frames having different sizes by a unit distance L. It is assumed that the distance by which an AF frame moves is the distance between the center coordinates before and after the AF frame is moved. In the example shown in FIG. 4C, the touch-move distance thresholds $\alpha 1$ to $\alpha 3$ increase as the AF frame size is smaller.

Figure 4D:
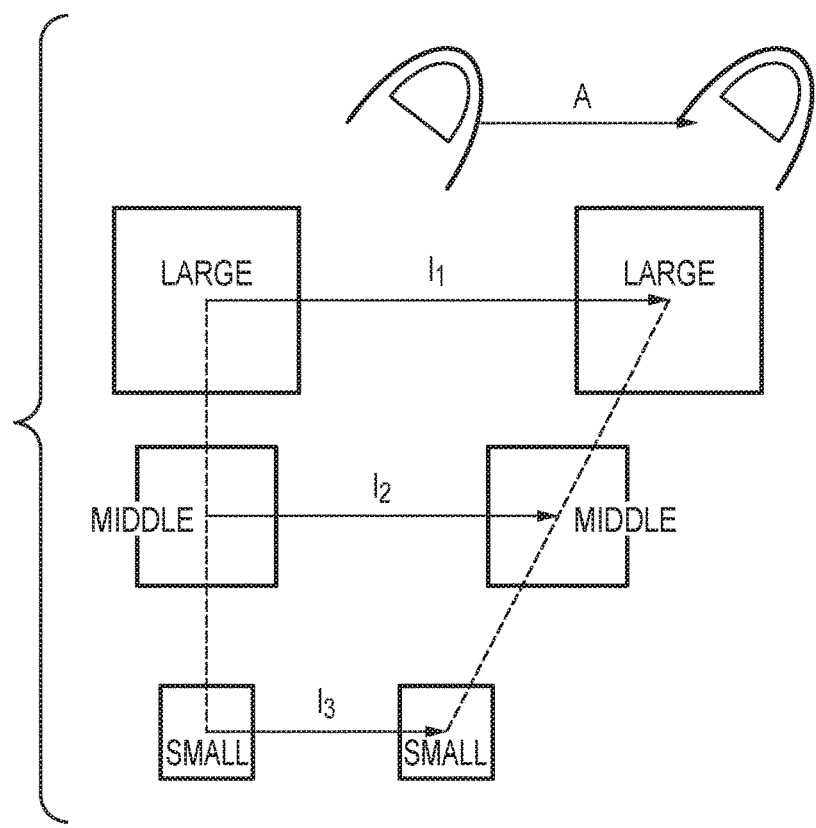

In the determination in step S507, the ratio at which the AF frame moves relative to the touch-move distance may also be changed in accordance with the AF size, rather than moving the AF frame by a predetermined distance if the touch-move distance is greater than or equal to the threshold corresponding to the current AF frame size. That is to say, a configuration may also be employed in which, when a touch-move of a distance A is performed, the distance by which the AF frame moves increases as the AF frame size is larger. As shown in FIG. 4D, the distance by which the AF frame moves per a touch-move distance A may be L1 when the AF size is large, L2 (<L1) when middle, and L3 (<L2)

when small. In this case, in step S307, a coefficient for determining the amount by which the AF frame moves corresponding to the touch-move distance, instead of the touch-move distance threshold, is changed in accordance with the AF frame size.

Note that the touch-move distance threshold may also be obtained as follows. In the case where the length in the X-axis direction of the touch panel 28a is Xp, and the length in the X-axis direction of the display unit within the viewfinder 16 is Xf, the touch-move distance required for the AF frame to move in the display unit within the viewfinder 16 by a distance L is set to L*(Xp/Xf). Thus, the touch-move distance required to change the AF position by a predetermined distance is set to be the same in the relative coordinates mode and the absolute coordinates mode. If the threshold for the AF frame of the middle size, of several AF frame sizes, is set as mentioned above, the user can operate with the same feeling as in usual operations (operations in a state of viewing the panel) in the case of the middle size. If the AF frame size is larger than the middle size, the AF frame moves with a smaller operation than that in the case of the middle size, and if the AF frame size is smaller, the AF frame can be adjusted more finely. Accordingly, intuitive operations suitable for the AF frame size can be performed.

In step S508, the system control unit 50 moves the display position of the guide indicator by a predetermined amount in the direction of the touch-move (e.g. a straight direction moving from a starting point to the current touch position).

FIGS. 8A to 8D show touch operations and corresponding displays within the viewfinder 16 in the case of moving an AF frame and changing the size thereof with touch operations made to the touch panel 28a in the relative coordinates mode while viewing the viewfinder 16. FIGS. 8A to 8D depict the case where the entire face of the touch panel 28a is the effective area.

Figure 8A:
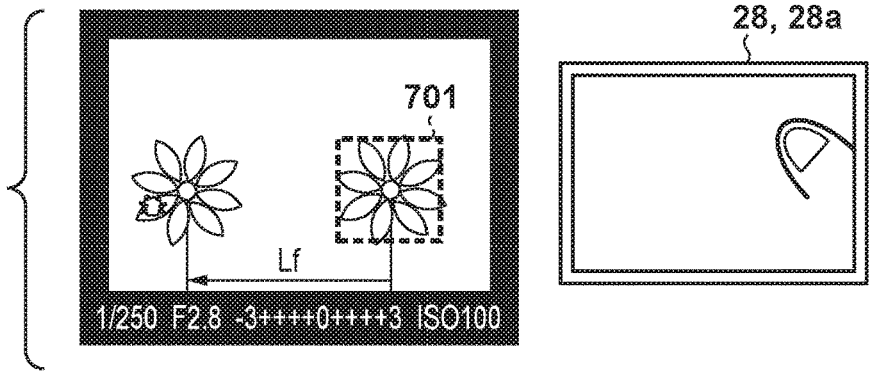
FIGS. 8A to 8D are schematic diagrams related to movement and size change of an AF frame according to the embodiment.

FIG. 8A shows a state where an AF frame is displayed on the in-viewfinder display unit 41, and shows a state where a touch-down operation has been detected within the effective area (step S503 in FIG. 7). To notify the user of the detection of a touch-down, the system control unit 50 displays an item indicator 701 indicating the position and size of the current AF frame on the in-viewfinder display unit 41. In the relative coordinates mode, the AF frame is not moved to the touch position, and accordingly the touch position indicator is not displayed. At this time, the system control unit 50 converts the coordinates of the AF frame to coordinates in the in-viewfinder display unit 41 and displays the indicator (at the corresponding position).

The distance Lf in a subject image in the viewfinder 16 shown in FIG. 8A corresponds to the distance Lp in the display unit 28 shown in FIG. 6A. That is to say, in the case where the AF frame moves by distance Lf on the in-viewfinder display unit 41 and in the case where the AF frame moves by Lp on the display unit 28, the set value for AF processing after the movement is the same if the position of the originally-set AF frame is the same. Accordingly, a setting is configured so that the amounts of change in the AF position set by an operation of moving the AF frame by the distance Lf on the display unit within the viewfinder 16 and an operation of moving the AF frame by the distance Lp on the display unit 28 (touch panel 28a) are the same.

At the point shown in FIG. 8A, the AF frame is set to have a size and at a position so that the AF frame substantially circumscribes corolla of the right flower, as indicated by the item indicator 701. The case of changing the AF frame setting from this state so as to set the AF frame at an insect on a petal of the left flower will now be considered.

In this case, first, the user moves leftward the finger that has touched down while keeping the touch in order to roughly move the AF frame to the vicinity of the left flower. This touch operation is detected as a touch-move within the effective area, and the system control unit 50 performs processing in step S506 and subsequent steps in FIG. 7. Upon detecting the touch-move, the system control unit 50 starts to display the guide indicator.

Figure 8B:
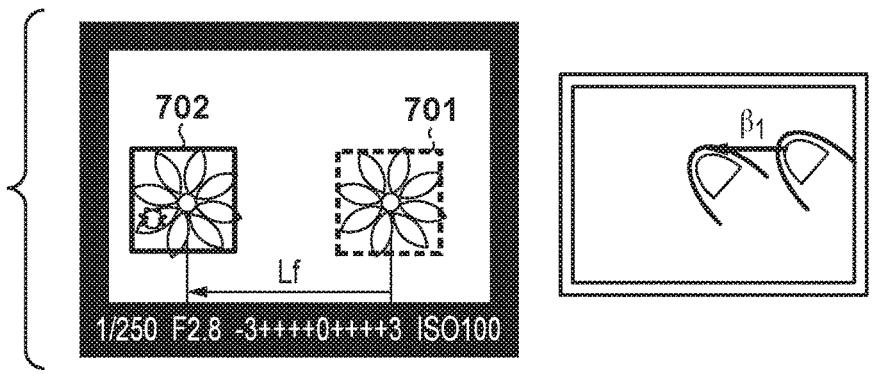
Figure 8C:
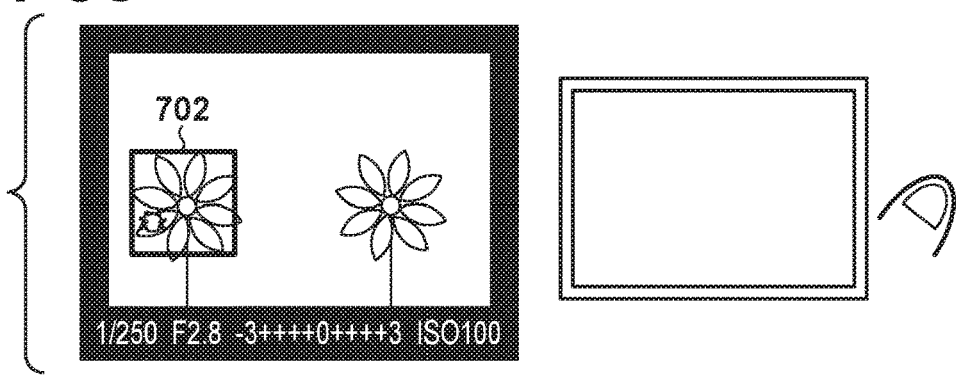

It is assumed here that, during a touch-move of the distance β1, the touch-move distance threshold is reached a plurality of times, and then the AF frame is displayed at a position moved by the distance Lf. As a result of this touch-move, the display position of the guide indicator 702 is as shown in FIG. 8B. The user then checks that the display position of the guide indicator 702 has moved to the desired position, and detaches the finger from the touch panel 28a (FIG. 8C). This touch operation is detected as a touch-up, and the system control unit 50 stops displaying the item indicator 701 that has indicated the AF frame before being changed, and ends touch operation processing in the relative coordinates mode (S304). At this point, the guide indicator 702 serves as the item indicator.

Next, upon the user performing an operation to change the AF frame size in order to match the AF frame size with the size of the insect, this operation is detected in step S305, and the system control unit 50 performs processing in steps S306 and S307. It is assumed here that the AF frame size is changed to the size depicted by an item indicator 703 in FIG. 8D.

Next, the user performs a touch-move for moving the AF frame in order to match the AF frame with the insect. Here, it is assumed, as shown in FIG. 8D, that the touch-move distance is β2, and the distance from the item indicator 703 before being moved and the guide indicator 704 after being moved is Lf'.

Figure 8D:
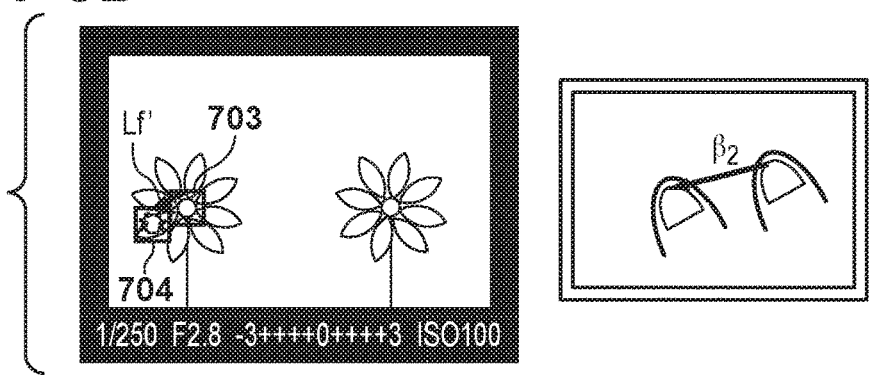

The touch-move distance β1 required to move the displayed AF frame by the distance Lf in FIG. 8B and the touch-move distance β2 required to move the displayed AF frame by the distance Lf' on the display unit within the viewfinder 16 shown in FIG. 8D satisfies the following relation:

$$(Lf/\beta1)>(Lf'/\beta2)$$

That is to say, the amount by which the AF frame moves per a unit touch-move distance is larger in the case of the movement in FIG. 8B where the AF frame size is larger.

Note that, in the case where the direction in which an item can be moved is restricted, the item may be moved in a direction of the largest component, among components in directions in which the item can be moved, of the straight line representing the touch-move (straight line connecting the starting point and the current touch position). For example, if the item can be moved only in x and y directions, the item is moved in the direction of larger one of the x-direction component and the y-direction component of the straight line representing the touch-move. After moving the display position of the guide indicator, the system control unit 50 sets the touch-move distance to 0, and also updates the starting point of the touch-move to the current touch position.

In step S509, similarly to step S407, the system control unit 50 determines whether or not a touch-up has been detected on the touch panel 28a, ends the processing if it is determined that a touch-up has been detected, and returns the processing to step S504 if not. Note that, if it is determined that a touch-up has been detected, the system control unit 50 changes the AF frame setting position and size to the position and size of the guide indicator at the time of touch-up. A configuration may also be employed in which, when a touch-up is detected, focus detection processing is performed, similarly to the case where the first shutter switch 62 turns on for the AF frame at that point. In the case of performing focus detection processing when a touch-up is detected, if the AF frame size is a predetermined size or smaller, the time taken until the focus detection processing is started is made longer than that in the case where the AF frame is larger than the predetermined size.

The above embodiment has described that either an absolute-coordinate setting or a relative-coordinate setting can be configured on a menu for the determination in step S302. However, the determination in step S302 is not limited thereto, and the following configuration may also be employed. That is to say, in step S302, the determination may be performed based on whether or not the proximity of an eye to the viewfinder 16 has been detected, and on the size of the effective area. Furthermore, a configuration may also be employed in which the relative coordinates mode is set if proximity of an eye to the viewfinder 16 has been detected, and the absolute coordinates mode is set if proximity of an eye to the viewfinder 16 has not been detected. Also, the touch-effective area may be a portion in the case of the relative coordinates mode, and the touch-effective area may be the entire face in the case of the absolute coordinates mode. The touch-effective area may also be a portion if proximity of an eye to the viewfinder 16 has been detected, and the touch-effective area may be the entire face if proximity of an eye to the viewfinder 16 has not been detected. The combinations are not limited to the aforementioned ones.

First, a description will be given to the case where the processing proceeds from S302 to S304 if proximity of an eye to the viewfinder 16 has been detected, and proceeds from S302 to S303 if not. That is to say, in the case where proximity of an eye to the viewfinder 16 has been detected, the touch-move distance when moving the display position of the AF frame by a predetermined distance decreases as the AF frame is larger. On the other hand, in the case where proximity of an eye to the viewfinder 16 has not been detected, the touch-move distance when moving the display position of the AF frame by a predetermined distance is constant regardless of the AF frame size. When the user is viewing the viewfinder 16, the range in which the user can perform a touch operation (i.e. the range in which absolute coordinates can be designated) is substantially limited even if the effective area is not made small. Also, when the user is viewing the viewfinder 16, it is more difficult for the user to see his/her hand (fingers) than when not viewing the viewfinder 16, and accordingly, it may be difficult to designate a position in the absolute coordinates mode. Then, if the position designation mode is switched to the relative coordinates mode when the output of the eyepiece sensor 91 is ON even if the absolute coordinates mode has been set, thereby being able to increase operability for the user.

Otherwise, a configuration may also be employed in which, after the determination of the position designation mode in step S302, it is determined whether the output of the eyepiece sensor 91 is ON or OFF, regardless of the result of determination of the position designation mode, and the processing proceeds to step S303 if the output of the eyepiece sensor 91 is OFF, and proceeds to step S304 if the output of the eyepiece 91 sensor is ON.

Next, a description will be given of the case where the processing proceeds from step S302 to step S304 if the size of the effective area is smaller than a predetermined size, and proceeds from S302 to S303 if the size of the effective area is larger than the predetermined size.

In the case where a relative-coordinates setting is configured for the touch operation input method, and the effective area is small, the following situation occurs. That is to say, in the case of fixing the touch-move distance relative to the amount by which the AF frame moves in the touch panel 28*a* regardless of the effective area size, a touch-move needs to be repeated again and again to move the AF frame by a predetermined distance, as the effective area is smaller.

On the other hand, if the amount by which the AF frame moves relative to the touch-move distance is increased in inverse proportion to the effective area size, the AF frame greatly moves with a small touch-move as the effective area is smaller. Accordingly, in the case where the effective area is smaller than a predetermined size, the touch-move distance required when moving the display position of the AF frame by a predetermined distance when the AF frame is large is made smaller than that when the AF frame is small, thereby being able to increase the operability for the user. That is to say, when the touch-effective area is smaller than a predetermined size, and the AF frame is large, the AF frame greatly moves with a small operation. Then, only a small touch-move distance is required when greatly moving the AF frame. When the AF frame is small, the user is likely to desire to finely set the AF frame position. Accordingly, the display position of the AF frame is not greatly moved with a small operation, and the AF frame is moved by a smaller distance at a time than when the AF frame is large. As a result, fine adjustment is facilitated.

In the case of operating while viewing the viewfinder 16, the user's face is present near the touch panel 28*a*, and therefore, the range of the touch panel 28*a* in which the user can actually touch with good operability is limited. In addition, in the state of viewing the viewfinder, the nose, cheek, or the like is likely to come into contact with the touch panel 28*a*. For this reason, if it is determined that the user is viewing the viewfinder 16 (i.e. if an object that is close to the viewfinder 16 has been detected by the eyepiece sensor 91; in the state where the output of the eyepiece sensor 91 is ON), the size of the effective area of the touch panel 28*a* may also be set smaller than a predetermined size. For example, the entire face of the touch panel 28*a* may be the effective area if the output of the eyepiece sensor 91 is OFF, and a half face of the touch panel 28*a* may be the effective area if the output of the eyepiece sensor 91 is ON. Otherwise, a configuration may also be employed in which the user can set the size of the effective area for touch operations at the time of viewing the viewfinder. The user may also be able to select, on the menu screen, a range of the effective area (area setting) when viewing the viewfinder from among the entire face, the right half, the left half, and one-fourth area at the upper right, for example.

That is to say, in the example in FIG. 4C, a configuration may also be employed in which the thresholds $\alpha 1$ to $\alpha 3$ are set to be equal if the effective area is largest, and the thresholds $\alpha 1$ to $\alpha 3$ are set so that $\alpha 1 < \alpha 2 < \alpha 3$ if the effective area is halved. Note that a configuration may also be employed in which $\alpha 1$ to $\alpha 3$ are set to be equal if the size of the touch-effective area is the entire face to the half, and are changed so that $\alpha 1 < \alpha 2 < \alpha 3$ or $\alpha 1 = \alpha 2 < \alpha 3$ if the size of the touch-effective area is less than half. In this case, the determination in step S302 is performed so that the processing proceeds to step S303 if the user-set touch-effective area is the entire face, and proceeds to step S304 if the user-set touch-effective area is a half face.

Note that, if the size of the effective area is changed depending on the AF frame size even in the case of the absolute coordinates mode or in the case where it is determined that the user is not viewing the viewfinder 16, the following situation may occur. In the case of the absolute coordinates mode, the absolute coordinates mode in which the touch position matches the AF frame position will no longer hold true. In the case where the user is not viewing the viewfinder, a shift between the finger position and the AF frame position increases every time a touch-move is performed, due to the frame size. That is to say, the AF frame moves further responding to a finger operation when the AF frame is large (in both the absolute coordinates mode and the relative coordinates mode), but does not move much when the AF frame is small, which makes it harder for the user to see.

Note that the above embodiment has described that the live view image is displayed on the display unit 28 if it is determined that the user it not viewing the viewfinder 16. However, an AF position setting screen that shows a list of positions at which the AF frame can be set may also be displayed on the display unit 28.

Even in the case of not having a configuration in which the user viewing the viewfinder 16 is detected, whether or not to allow the user to view a subject image through the viewfinder 16 may be configured to be switchable. For example, a configuration may also be employed in which the user can perform an operation of lifting up and down the mirror and an operation of switching where to display the live view image.

Furthermore, a configuration may also be employed in which, even in the case of the relative coordinates mode, the user sets the AF position at a position corresponding to the position at which a touch operation is performed, by means of a double-tap or a long-touch on the touch panel 28a. That is to say, even in the case where, usually, the AF frame is moved not based on the touch start position, but from an originally-set position in accordance with the touch-move distance, the AF frame is set at the position (absolute coordinates) corresponding to the touch position, regardless of the originally-set position, if a double-tap or a long-touch is performed.

Modifications

Figure 9A:
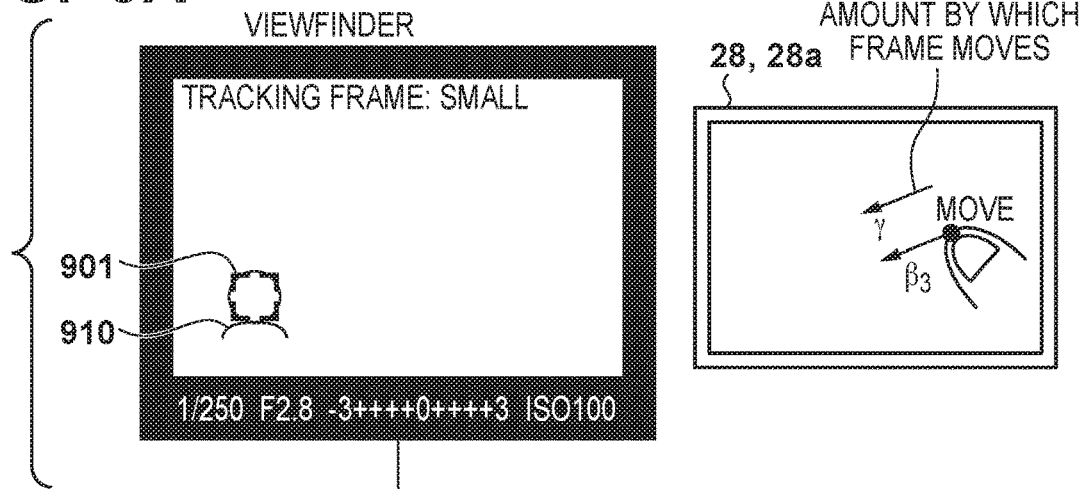
FIGS. 9A to 9C are schematic diagrams related to a modification of the embodiment.
Figure 9B:
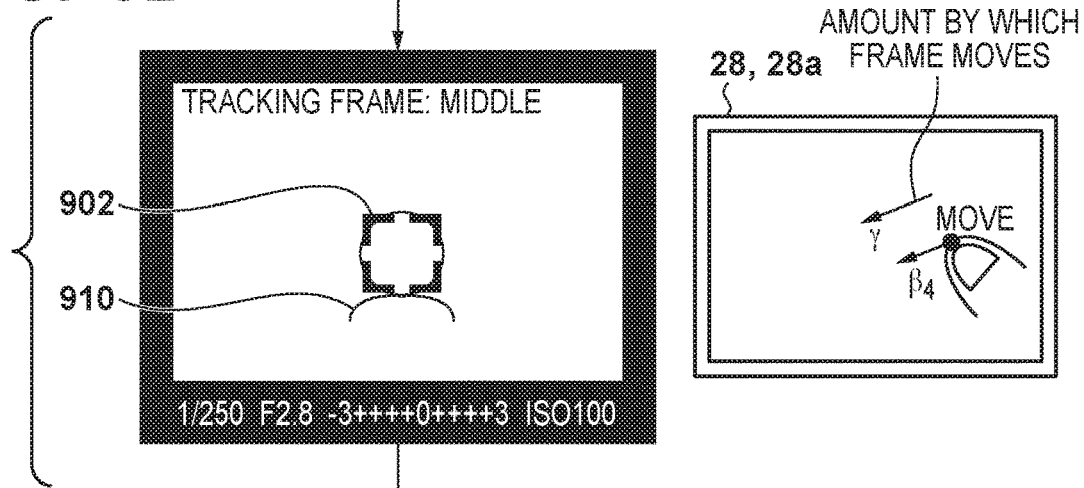
Figure 9C:
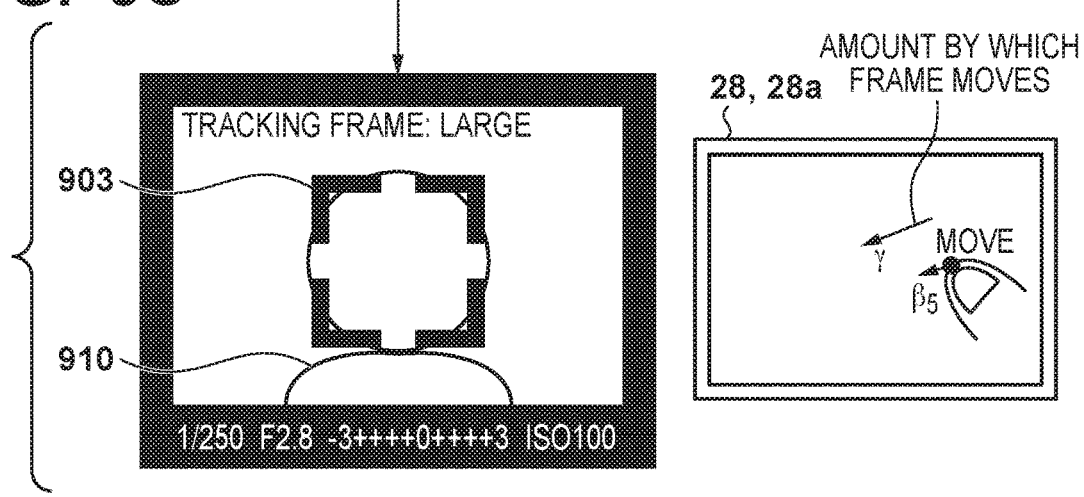

FIGS. 9A to 9C schematically show an example of the case where an item subjected to a moving operation is a subject tracking area (subject tracking frame, tracking position). Here, the face area of a person 910 is set as a subject tracking frame, and a situation is depicted where the size of the face area gradually increases within the display screen as a result of the person 910 approaching the digital camera 100. Note that a similar situation may also occur in the case where the optical zoom ratio of the lens unit 150 or the cropping area in the image capture unit 22 (electronic zoom ratio) gradually changes.

Even in the case where an item whose size may change in time series thus is subjected to a moving operation, the idea of decreasing (increasing) the touch-move distance threshold when the item size is large (small) compared with the case where the item size is small (large) may also apply. The moving operation can be performed similarly to the case of the AF frame by dividing item sizes into a plurality of ranges and associating each size range with a touch-move distance threshold.

For example, the ranges of the size of the subject tracking frame allowed in the digital camera 100 from the smallest size to the largest size are divided, in advance, into a plurality of size zones (e.g. large, middle, and small). If it is detected in step S305 that the size of the subject tracking frame has been changed, the system control unit 50 determines, in step S306, the size zone to which the current subject tracking frame size corresponds, and sets, in step S307, the touch-move distance threshold corresponding to the corresponding size zone. Note that, in order to determine the subject tracking frame size at more strict timing, the determination of the subject tracking frame size and the change (setting) of the touch-move distance threshold may also be performed when a touch-down is detected within the effective area during the processing in step S304. Note that, similarly to the case where the item is the AF frame, if the subject tracking frame size has become smaller than or equal to a predetermined lower limit size, the subject tracking operation may be temporarily stopped.

In the example shown in FIGS. 9A to 9C, it is assumed that the sizes of subject tracking frames 901 to 903 match the size zones "small", "middle", and "large", respectively. Assuming that the touch-move distances required to move the subject tracking frame by a specific amount $\gamma$ for the respective size zones are $\beta 3$, $\beta 4$, and $\beta 5$, the system control unit 50 sets the touch-move distance threshold so as to satisfy the relation in which $\beta 3 > \beta 4 > \beta 5$.

It is envisioned that, similarly to the AF frame, a small subject tracking frame size is associated with a small subject. For this reason, if the sensitivity to the moving distance relative to a touch-move is high, it may degrade operability or degrade tracking performance. For this reason, the touch-move distance required to move the subject tracking frame by a predetermined amount when the subject tracking frame size is a second size that is smaller than a first size is made larger than that in the case of the first size, thereby increasing operability and suppressing a decrease in tracking performance.

According to this embodiment, in an image capture apparatus in which an item position can be changed by an operation of moving a touch position, the distance by which the touch position is moved required to move the item by a predetermined distance is changed in accordance with the item size. Specifically, the distance by which the touch position is moved required to move the item by a predetermined distance when the item size is a second size that is smaller than a first size is made larger than that when the item size is the first size. It is thus possible to increase operability when moving an item such as an AF frame, a photometric frame, or a subject tracking frame, and to suppress a decrease in performance of AF or subject tracking due to an item having moved to an unintended position.

Note that the above embodiment has described that the AF frame is moved by a touch-move. However, the above embodiment is also applicable to the cases of a dial operation and a cross key operation, in addition to a touch-move. That is to say, when the user is viewing the viewfinder, the distance by which the AF frame is moved is changed depending on the AF frame size, in accordance with one rotation of a dial or one operation of the cross key. Note that, in the case where the AF frame position is not set by a touch operation, the distance by which the AF frame is moved may also be changed in accordance with one operation of a dial or the cross key depending on the AF frame, even when the user is not viewing the viewfinder.

Furthermore, the above embodiment has described that it is determined whether or not the user is viewing the viewfinder by detecting proximity of an eye to the viewfinder. However, this determination may also be performed based on which of the viewfinder and the display unit 28 the user has set so that a subject image can be viewed. That is to say, if the viewfinder is of an optical type, the determination may also be performed based on whether the user has lifted down the mirror (i.e. the user's eye is close to the viewfinder), or the live view image is displayed on the display unit 28 (i.e. the user's eye is not close to the viewfinder). If the viewfinder is an electronic viewfinder, the determination may also be performed based on whether the user causes the live view image to be displayed on the display unit within the viewfinder 16 (i.e. the user's eye is close to the viewfinder) or on the display unit 28.

Furthermore, the touch panel 28a may not be integrally provided with the display unit 28, and for example, the touch panel 28a may also be provided as a touch pad. In this case as well, the touch-move distance threshold corresponding to the AF frame size may also be changed based on whether a subject image can be viewed through the viewfinder or the live view image is displayed on the display unit 28.

Although the AF frame is displayed with a large, middle, or small size in the above description, the frame having a predetermined size to be displayed may be changed. That is to say, in the case of an optical viewfinder or the like, the number of frames having a predetermined size to be lit may be changed, e.g. from 1 to 4, 9, or 36. A lit area is a setting area for designating a subject for AF, AE, or the like (i.e. indicates an area for which processing such as AF or AE is to be performed).

Note that various kinds of control that have been described as those to be performed by the system control unit 50 may be performed by one piece of hardware, or may be assigned to a plurality of pieces of hardware to control the entire apparatus.

The embodiment is not limited to the above embodiment, and various modes that do not depart from the gist of this invention are also included in the present invention. Furthermore, the above embodiment only describes one embodiment of the present invention, and embodiments may also be combines as appropriate.

The above-described embodiment has taken the case in which the present invention is applied to the digital camera 100 as an example. However, the present invention is also applicable to any kinds of image capture apparatuses in which an item whose size is variable can be changed by moving a touch position in a state where a user is viewing a viewfinder. That is to say, the present invention is applicable to cellular phone terminals and portable image viewers that are equipped with a viewfinder, as well as printers, digital photo frames, music players, game machines, electronic book readers, and the like that are equipped with a viewfinder.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-014515, filed Jan. 30, 2017, which is hereby incorporated by reference herein in its entirety.

What is claimed is:

1. An image capture apparatus comprising at least one processor which, when executing a program stored in a memory, functions as:
a touch detection unit configured to detect a touch operation made to a touch panel; and
a control unit configured to control the image capture apparatus, in a case where a subject image can be viewed via a viewfinder different from the touch panel and a predetermined item is displayed on a first display unit that is within the viewfinder and can be viewed via the viewfinder, so as to move the predetermined item from a position where the predetermined item was displayed before moving of a touch position, based on a movement of the touch position,
wherein the predetermined item indicates a designated area of the subject image,
wherein a moving distance of the predetermined item on the first display unit from the position where the predetermined item on the first display unit was displayed before moving of the touch position, to a position where the predetermined item on the first display unit is displayed after moving of the touch position, is based on the moving distance of the touch position on the touch panel,
wherein the control unit controls, in a case where the designated area has a first size, the predetermined item is moved on the first display unit for a first distance according to the movement of the touch position on the touch panel for the first distance, and in a case where the designated area has a second size larger than the first size, the predetermined item is moved for a second distance on the first display unit which is larger than the first distance according to the movement of the touch position on the touch panel for the first distance, and
wherein the control unit controls, in a case where a live view image and the predetermined item are displayed on a second display unit outside of the viewfinder and the predetermined item indicates a designated area of the live view image, the predetermined item on the second display unit is moved for the same distance according to the movement of the touch position on the touch panel for the first distance in either case where the designated area has the first size or the second size.

2. The image capture apparatus according to claim 1, wherein the at least one processor further functions as:
a proximity detection unit configured to detect proximity of an object to the viewfinder,
wherein, if the proximity detection unit has detected proximity of an object to the viewfinder, the control unit controls the moving distance of the predetermined item on the first display unit for the first moving distance of the touch position on the touch panel, larger when the predetermined item has the second size than when the predetermined item has the first size, and
if the proximity detection unit has not detected proximity of an object to the viewfinder, the control unit controls the image capture apparatus so that the moving distance of the predetermined item on the second display unit outside of the viewfinder for the first moving distance of the touch position on the touch panel is the same in either case when the predetermined item has the first size or the second size.

3. The image capture apparatus according to claim 2, wherein if the proximity detection unit has not detected proximity of an object to the viewfinder, the control unit controls so that the image capture apparatus displays the live view image on the second display unit.

4. The image capture apparatus according to claim 1, wherein, in a case where the subject image can be viewed via the viewfinder, the control unit controls the image capture apparatus, in accordance with a predetermined touch operation having been performed on the touch panel, so as to display the predetermined item at a position on the first display unit, the position corresponding to a position at which the predetermined touch operation was performed.

5. The image capture apparatus according to claim 4, wherein the predetermined touch operation is one of a double-tap or a long-touch.

6. The image capture apparatus according to claim 1, wherein the at least one processor further functions as:
an area setting unit configured to set, on the touch panel, a touch-effective area, wherein the predetermined item is moved on the first display unit according to a touch operation in the touch-effective area whereas the predetermined item is not moved on the first display unit according to a touch operation in an area different from the touch-effective area,
wherein, in a case where the subject image can be viewed via the viewfinder, the touch-effective area on the touch panel has a size smaller than a predetermined size, and
in a case where a live view image is displayed on a second display unit outside of the viewfinder, the predetermined item displayed on the first display unit is moved according to a touch operation performed in an area larger than the predetermined size on the touch panel.

7. The image capture apparatus according to claim 6, wherein the touch panel and the second display unit outside of the viewfinder are provided integrally.

8. The image capture apparatus according to claim 1, wherein a size of the designated area can be selected from among at least the first size, the second size, and a third size that is larger than the second size, and
(i) a movement of the predetermined item on the first display unit within the viewfinder for the first moving distance of the touch position on the touch panel in a case where a subject image can be viewed via the viewfinder and a size of the predetermined item is the second size and (ii) a movement of the predetermined item on the second display unit outside of the viewfinder for the first moving distance of the touch position on the touch panel in a case where a live view image is displayed on the second display unit outside of the viewfinder are the same.

9. The image capture apparatus according to claim 1, wherein the designated area is an area indicating a position at which autofocus is to be performed.

10. The image capture apparatus according to claim 1, wherein the designated area is an area indicating a position at which automatic exposure is to be performed.

11. The image capture apparatus according to claim 1, wherein the viewfinder is an electronic viewfinder.

12. The image capture apparatus according to claim 1, wherein the viewfinder is an optical viewfinder.

13. The image capture apparatus according to claim 1, wherein the at least one processor further functions as:
a changing unit configured to enable a size of the predetermined item to be changed at least to the first size and to the second size.

14. The image capture apparatus according to claim 13, wherein the changing unit changes the size of the predetermined item in accordance with one of an operation of strongly pressing the touch panel, a double-tapping operation, and an operation of touching the touch panel for a predetermined time or longer.

15. The image capture apparatus according to claim 1, wherein the control unit controls the image capture apparatus so as to display the predetermined item with a size that is currently set, on the first display unit within the viewfinder, in accordance with a touch with the touch panel having been started.

16. The image capture apparatus according to claim 1, wherein the predetermined item is an item indicating a tracking position, and a size of the predetermined item is changed in accordance with a size of a subject to be tracked.

17. The image capture apparatus according to claim 1, wherein the at least one processor further functions as:
an accepting unit that is able to accept an operation for enabling the predetermined item to be moved that is made to an operation member provided separately from the touch panel and,
wherein, if the operation has been made to the operation member, the control unit does not change the moving distance of the predetermined item on the first display unit based on the size of the designated area.

18. An image capture apparatus comprising at least one processor which, when executing a program stored in a memory, functions as:
a touch detection unit configured to detect a touch operation made to a touch panel; and
a control unit configured to control the image capture apparatus, in a case of a relative coordinates mode in which a predetermined item, which indicates a designated area, is not displayed at a position on a display unit corresponding to a position at which a touch on the touch panel was started, but is displayed at a position which is moved from a position where the predetermined item was displayed before moving of a touch position, in accordance with an amount of a movement of the touch, so that a moving distance of the predetermined item from the position where the predetermined item was displayed on the display unit before moving of the touch position, to a position where the predetermined item is displayed on the display unit after moving of the touch position, is a first distance on the display unit, according to the movement of the touch position on the touch panel for the first distance, when the designated area has a first size, wherein a moving distance of the predetermined item from a position, where the predetermined item was displayed on the display unit before moving of the touch position, to a position where the predetermined item is displayed on the display unit after moving of the touch position, is a second distance on the display unit which is larger than the first distance, according to the movement of the touch position on the touch panel for the first distance, when the designated area has a second size larger than the first size, and wherein, in a case of an absolute coordinates mode in which the predetermined item is displayed at the position corresponding to the position at which the touch was started, the control unit controls the image capture apparatus so that the moving distance of the predetermined item from a position where the predetermined item was displayed before moving of the touch position, to a position where the predetermined item on the display unit is displayed after moving of the touch position, according to the movement of the touch position on the touch panel for the first distance, is the same in either case where the designated area has the first size or the second size.

19. The image capture apparatus according to claim 18, the at least one processor further functions as:

an accepting unit that is able to accept an operation for enabling the predetermined item to be moved that is made to an operation member provided separately from the touch panel, wherein, if the operation has been made to the operation member, the control unit does not control the image capture apparatus so as to change the moving distance of the predetermined item based on the size of the designated area.

20. An image capture apparatus comprising at least one processor which, when executing a program stored in a memory, functions as:

a touch detection unit configured to detect a touch operation made to a touch panel; and a control unit configured to control the image capture apparatus so that, in a case where, of the touch panel, an area in which a touch operation for moving a predetermined item indicating a designated area can be accepted has a size smaller than a predetermined size, a moving distance of the predetermined item from a position where the predetermined item was displayed before moving of a touch position, to a position where the predetermined item is displayed after moving of the touch position, according to a movement of the touch position on the touch panel for a first distance, is larger when the designated area has a second size larger than a first size than when the designated area has the first size, wherein, in a case where the area in which the touch operation for moving the predetermined item can be accepted has a size larger than the predetermined size, the control unit controls the image capture apparatus so that the moving distance of the predetermined item for a first moving distance of the touch position on the touch panel is the same in either case when the designated area has the first size or the second size.

21. The image capture apparatus according to claim 20, wherein the at least one processor further functions as:

an accepting unit that is able to accept an operation for enabling the predetermined item to be moved that is made to an operation member provided separately from the touch panel, wherein, if the operation has been made to the operation member, the control unit does not change the moving distance of the predetermined item base on the size of the designated area.

22. An image capture apparatus comprising at least one processor which, when executing a program stored in a memory, functions as:

a touch detection unit configured to detect a touch operation made to a touch panel; and a control unit configured to control the image capture apparatus so as to move a predetermined item from a position, where the predetermined item was displayed before moving of a touch position, to a position, where the predetermined item is displayed after moving of the touch position, according to a movement of the touch position on the touch panel for a first distance wherein the predetermined item is for designating an object area and displayed on a first display unit that is within a viewfinder and can be viewed via the viewfinder different from the touch panel, wherein the control unit controls, in a case where the object area has a first size, a moving distance of the predetermined item according to the movement of the touch position on the touch panel for the first distance is a first distance on the first display unit and in case where the object area has a second size larger than the first size, a moving distance of the predetermined item, according to the movement of the touch position on the touch panel for the first distance, is a second distance larger than the first distance on the first display unit.

23. A method for controlling an image capture apparatus comprising:

detecting a touch operation made to a touch panel, by a touch detection unit; and controlling the image capture apparatus, in a case where a subject image can be viewed via a viewfinder, so as to move a predetermined item from a position where the predetermined item was displayed before moving of a touch position, based on a movement of a touch position, wherein the predetermined item indicates a designated area of the subject image and is displayed on a first display unit that is within the viewfinder and can be viewed via the viewfinder, wherein a moving distance of the predetermined item on the first display unit from a position where the predetermined item on the first display unit was displayed before moving of a touch position, to a position where the predetermined item on the first display unit is displayed after moving of the touch position, is based on the moving distance of the touch position on the touch panel, wherein in the controlling, in a case where the designated area has a first size, the predetermined item is moved on the first display unit for a first distance according to the movement of the touch position on the touch panel for the first distance, and in a case where the designated area has a second size larger than the first size, the predetermined item is moved for a second distance on the first display unit which is larger than the first distance according to the movement of the touch position on the touch panel for the first distance, and wherein in the controlling, in a case where a live view image and the predetermined item are displayed on a second display unit outside of the viewfinder and the predetermined item indicates a designated area of the live view image, the predetermined item on the second display unit is moved for the same distance according to the movement of the touch position on the touch panel for the first distance in either case where the designated area has the first size or the second size.

24. A method for controlling an image capture apparatus comprising:
    detecting a touch operation made to a touch panel, by a touch detection unit; and
    controlling the image capture apparatus, in a case of a relative coordinates mode in which a predetermined item, which indicates a designated area, is not displayed at a position on a display unit corresponding to a position at which a touch on the touch panel was started, but is displayed at a position which is moved from a position where the predetermined item was displayed before moving of a touch position, in accordance with an amount of a movement of the touch, so that a moving distance of the predetermined item from a position where the predetermined item was displayed on the display unit before moving the touch position, to a position where the predetermined item is displayed on the display unit after moving of the touch position, is a first distance on the display unit, according to the movement of the touch position on the touch panel for the first distance, when the designated area has a first size,
    wherein a moving distance of the predetermined item from a position, where the predetermined item was displayed on the display unit before moving of the touch position, to a position where the predetermined item is displayed on the display unit after moving of the touch position, is a second distance on the display unit which is larger than the first distance according to the movement of the touch position on the touch panel for the first distance, when the designated area has a second size larger than the first size, and
    wherein, in a case of an absolute coordinates mode in which the predetermined item is displayed at the position corresponding to the position at which the touch was started, the controlling controls the image capture apparatus so that the moving distance of the predetermined item from a position where the predetermined item was displayed before moving of the touch position, to a position where the predetermined item on the display unit is displayed after moving of the touch position, according to the movement of the touch position on the touch panel for the first distance, is the same in either case where the designated area has the first size or the second size.

25. A method for controlling an image capture apparatus comprising:
    detecting a touch operation made to a touch panel, by a touch detection unit; and
    controlling the image capture apparatus, in a case where, of the touch panel, an area in which a touch operation for moving a predetermined item can be accepted has a size smaller than a predetermined size, so that a moving distance of the predetermined item from a position where the predetermined item was displayed before moving of a touch position, to a position where the predetermined item is displayed after moving of the touch position, according to a movement of the touch position on the touch panel for a first distance, is larger when a designated area has a second size larger than a first size than when the designated area has the first size, and
    wherein, in a case where the area in which the touch operation for moving the predetermined item can be accepted has a size larger than the predetermined size, the control unit controls the image capture apparatus so that the moving distance of the predetermined item for a first moving distance of the touch position on the touch panel is the same in either case when the designated area has the first size or the second size.

26. A method for controlling an image capture apparatus comprising: detecting a touch operation made to a touch panel; and
    controlling the image capture apparatus so that a moving distance of a predetermined item from a position, where the predetermined item was displayed before moving of a touch position, to a position, where the predetermined item is displayed after moving of the touch position, according to a movement of the touch position on the touch panel for a first distance, wherein the predetermined item is for designating an object area and displayed on a first display unit that is within a viewfinder that can be viewed via the viewfinder different from the touch panel,
    wherein, in controlling, in a case where the object area has a first size, a moving distance of the predetermined item according to the movement of the touch position on the touch panel for the first distance is the first distance on the first display unit and in a case where the object area has a second size larger than the first size, a moving distance of the predetermined item, according to the movement of the touch position on the touch panel for the first distance, is a second distance larger than the first distance, on the first display unit.

27. A non-transitory computer-readable storage medium storing a program that is executable by one or more processors, the program, when executed by the one or more processors, causes the one or more processors to perform a method for controlling an image capture apparatus comprising:
    detecting a touch operation made to a touch panel, by a touch detection unit; and
    controlling the image capture apparatus, in a case where a subject image can be viewed via a viewfinder, so as to move a predetermined item from a position where the predetermined item was displayed before moving of a touch position, based on a movement of the touch position,
    wherein the predetermined item indicates a designated area of the subject image and is displayed on a first display unit that is within the viewfinder and can be viewed via the viewfinder,
    wherein a moving distance of the predetermined item on the first display unit from a position where the predetermined item on the first display unit was displayed before moving of the touch position, to a position where the predetermined item on the first display unit is displayed after moving of the touch position, is based on the moving distance of the touch position on the touch panel,
    wherein in the controlling, in a case where the designated area has a first size, the predetermined item is moved on the first display unit for a first distance according to the movement of the touch position on the touch panel for the first distance, and in a case where the designated area has a second size larger than the first size, the predetermined item is moved for a second distance on the first display unit which is larger than the first distance according to the movement of the touch position on the touch panel for the first distance, and wherein in the controlling, in a case where a live view image and the predetermined item are displayed on a second display unit outside of the viewfinder and the predetermined item indicates a designated area of the live view image, the predetermined item on the second display unit is moved for the same distance according to the movement of the touch position on the touch panel for the first distance in either case where the designated area has the first size or the second size.

28. A non-transitory computer-readable storage medium storing a program that is executable by one or more processors, the program, when executed by the one or more processors, causes the one or more processors to perform a method for controlling an image capture apparatus comprising:

detecting a touch operation made to a touch panel, by a touch detection unit; and controlling the image capture apparatus, in a case of a relative coordinates mode in which a predetermined item, which indicates a designated area, is not displayed at a position on a display unit corresponding to a position at which a touch on the touch panel was started, but is displayed at a position which is moved from a position where the predetermined item was displayed before moving of a touch position, in accordance with an amount of a movement of the touch, so that a moving distance of the predetermined item from a position where the predetermined item was displayed on the display unit before moving the touch position, to a position where the predetermined item is displayed on the display unit after moving of the touch position, is a first distance on the display unit, according to the movement of the touch position on the touch panel for the first distance, when the designated area has a first size, wherein a moving distance of the predetermined item from a position, where the predetermined item was displayed on the display unit before moving of the touch position, to a position where the predetermined item is displayed on the display unit after moving of the touch position, is a second distance on the display unit which is larger than the first distance according to the movement of the touch position on the touch panel for the first distance, when the designated area has a second size larger than the first size, and wherein, in a case of an absolute coordinates mode in which the predetermined item is displayed at the position corresponding to the position at which the touch was started, the controlling controls the image capture apparatus so that the moving distance of the predetermined item from a position where the predetermined item was displayed before moving of the touch position, to a position where the predetermined item on the display unit is displayed after moving of the touch position, according to the movement of the touch position on the touch panel for the first distance, is the same in either case where the designated area has the first size or the second size.

29. A non-transitory computer-readable storage medium storing a program that is executable by one or more processors, the program, when executed by the one or more processors, causes the one or more processors to perform a method for controlling an image capture apparatus comprising:

detecting a touch operation made to a touch panel, by a touch detection unit; and controlling the image capture apparatus, in a case where, of the touch panel, an area in which a touch operation for moving a predetermined item can be accepted has a size smaller than a predetermined size, so that a moving distance of the predetermined item from a position where the predetermined item was displayed before moving of a touch position, to a position where the predetermined item is displayed after moving of the touch position, according to a movement of the touch position on the touch panel for a first distance, is larger when a designated area has a second size larger than a first size than when the designated area has the first size, and wherein, in a case where the area in which the touch operation for moving the predetermined item can be accepted has a size larger than the predetermined size, the control unit controls the image capture apparatus so that the moving distance of the predetermined item for a first moving distance of the touch position on the touch panel is the same in either case when the designated area has the first size or the second size.

30. A non-transitory computer-readable storage medium storing a program that is executable by one or more processors, the program, when executed by the one or more processors, causes the one or more processors to perform a method for controlling an image capture apparatus comprising:

detecting a touch operation made to a touch panel; and controlling the image capture apparatus so that a moving distance of a predetermined item from a position, where the predetermined item was displayed before moving of a touch position, to a position, where the predetermined item is displayed after moving of the touch position, according to a movement of the touch position on the touch panel for a first distance, wherein the predetermined item is for designating an object area and displayed on a first display unit that is within a viewfinder that can be viewed via the viewfinder different from the touch panel, wherein, in controlling, in a case where the object area has a first size, a moving distance of the predetermined item according to the movement of the touch position on the touch panel for the first distance is the first distance on the first display unit and in a case where the object area has a second size larger than the first size, a moving distance of the predetermined item, according to the movement of the touch position on the touch panel for the first distance, is a second distance larger than the first distance on the first display unit.

* * * * *